US006885465B2

(12) United States Patent
Kitabayashi et al.

(10) Patent No.: US 6,885,465 B2
(45) Date of Patent: Apr. 26, 2005

(54) OPTICAL ELEMENT INSPECTION DEVICE AND OPTICAL ELEMENT INSPECTION METHOD

(75) Inventors: Masashi Kitabayashi, Horigane-mura (JP); Yuji Takado, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 389 days.

(21) Appl. No.: 10/242,413

(22) Filed: Sep. 13, 2002

(65) Prior Publication Data

US 2003/0063293 A1 Apr. 3, 2003

(30) Foreign Application Priority Data

Sep. 19, 2001 (JP) ........................................ 2001-285783

(51) Int. Cl.[7] .......................... G01B 11/14; G01B 9/00
(52) U.S. Cl. ...................................... 356/614; 356/124
(58) Field of Search ................................ 356/614, 615, 356/619, 622, 124, 126, 127; 353/31, 33

(56) References Cited

FOREIGN PATENT DOCUMENTS

| JP | 2000-221588 | * | 8/2000 |
|---|---|---|---|
| JP | 2000-258859 | * | 9/2000 |

* cited by examiner

Primary Examiner—Layla G. Lauchman
(74) Attorney, Agent, or Firm—Oliff & Berridge, PLC

(57) ABSTRACT

The invention provides an optical element inspection device and an optical element inspection method capable of inspecting a relative position of each reflective surface of an optical element. An optical element inspection device includes a pedestal with a cross-dichroic prism installed thereon, an autocollimator which introduces the measurement light into any of four reflective surfaces at the angle of incidence of 45°, and detects the return light thereof, and a switching device to introduce the measurement light into only either a left area or a right area. The relative position between two reflective surfaces of each color reflective surface can be easily inspected by introducing the measurement light in only the reflective surface of either area of the color reflective surface by a switching device.

15 Claims, 29 Drawing Sheets

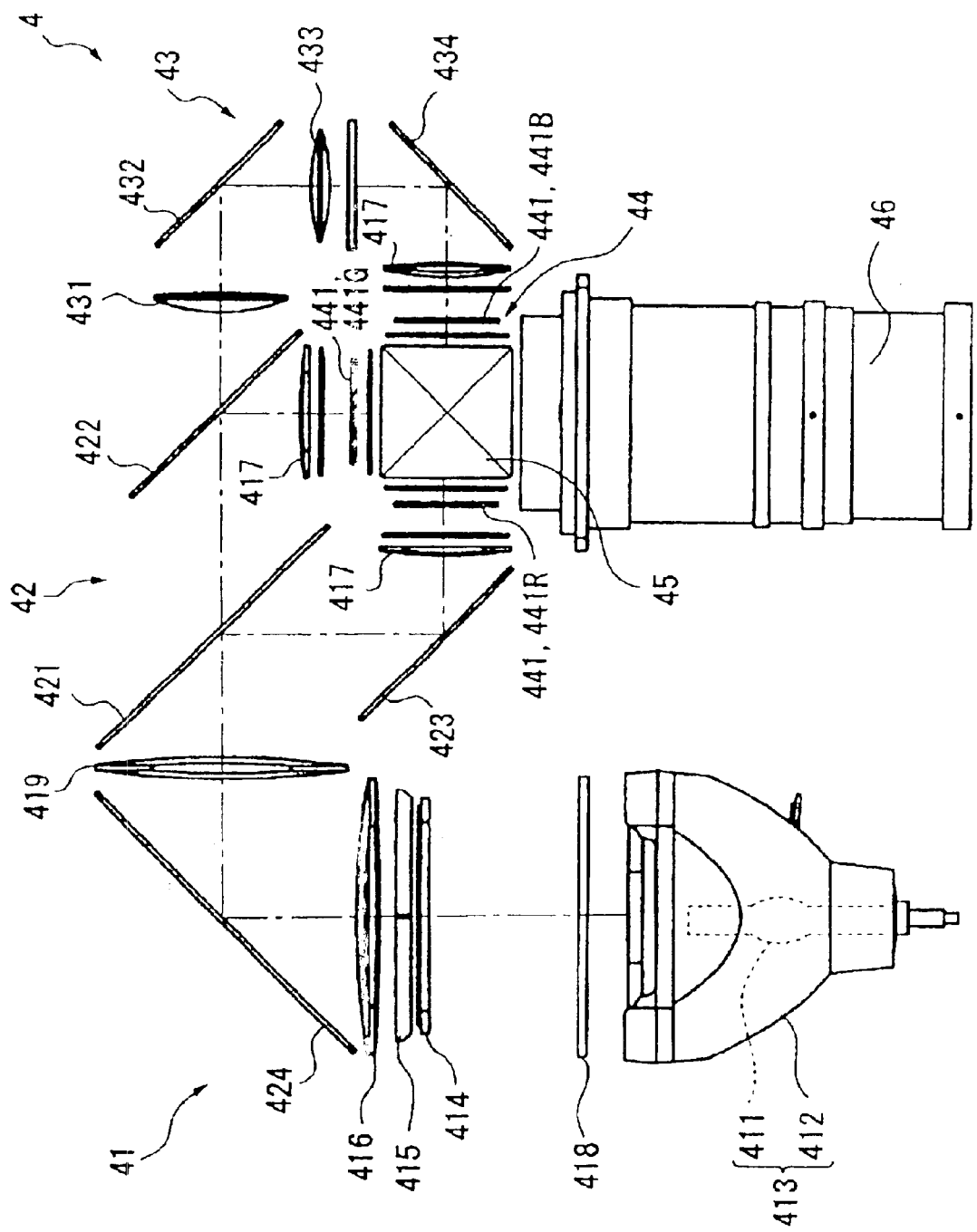
[FIG. 1]

[FIG. 2]
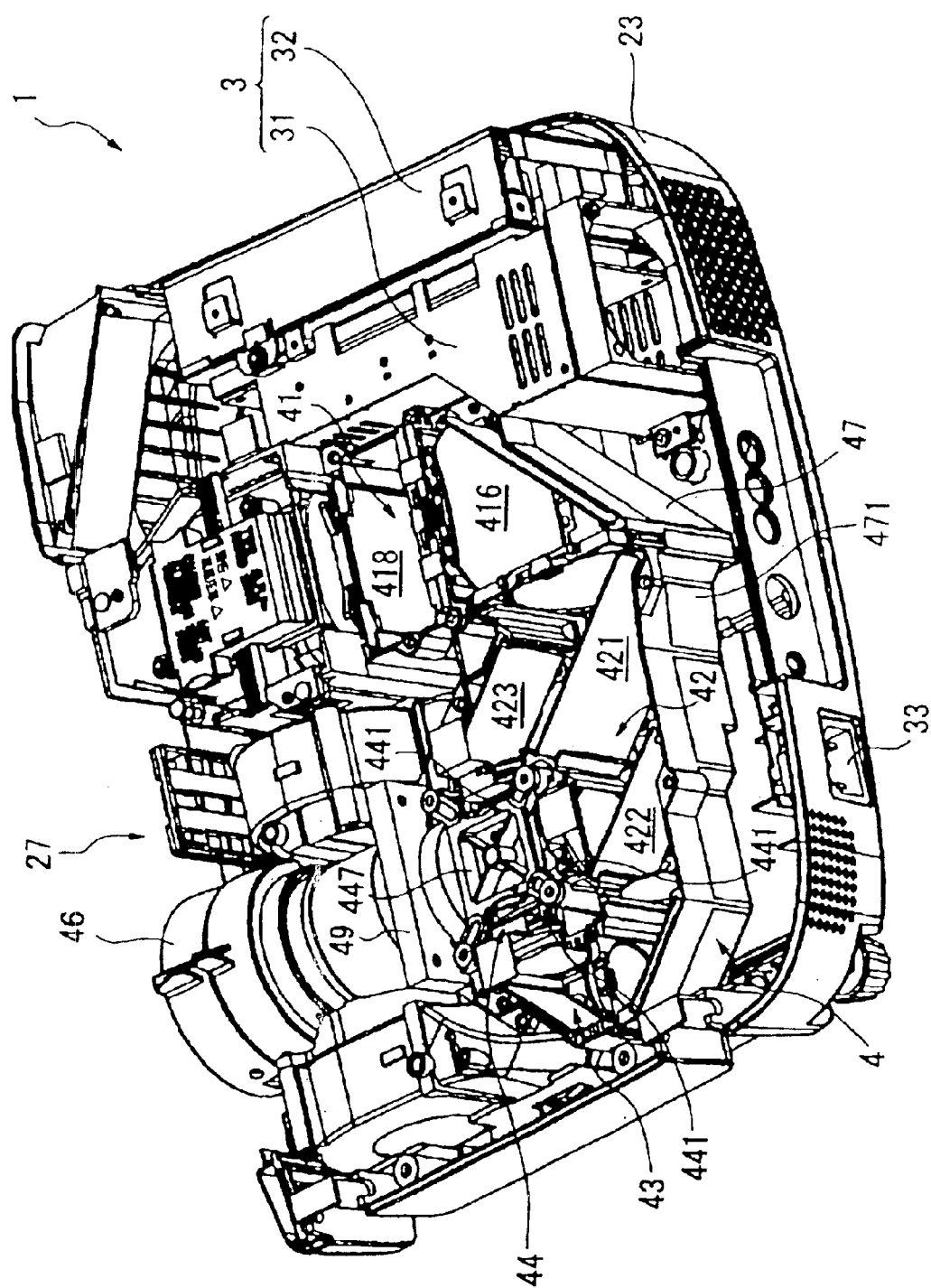

[FIG. 3]
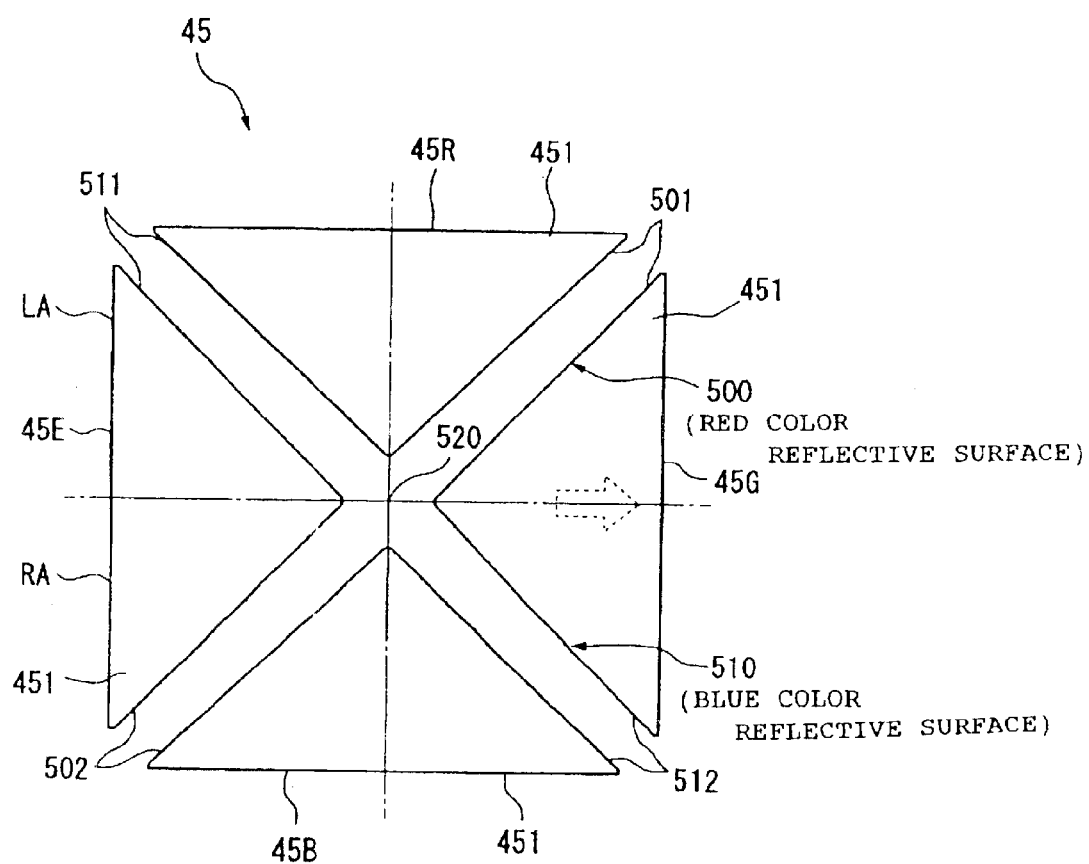

[FIG. 4]
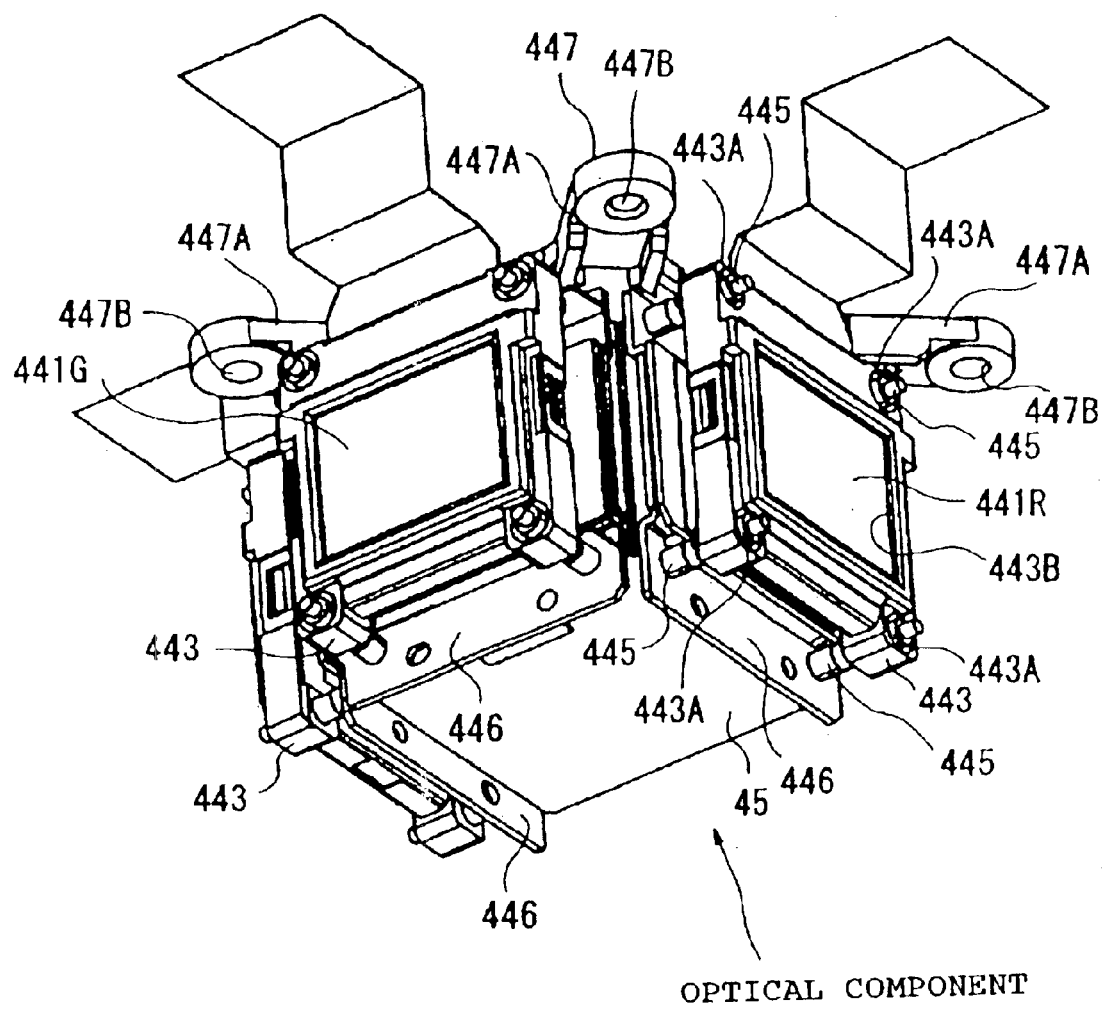

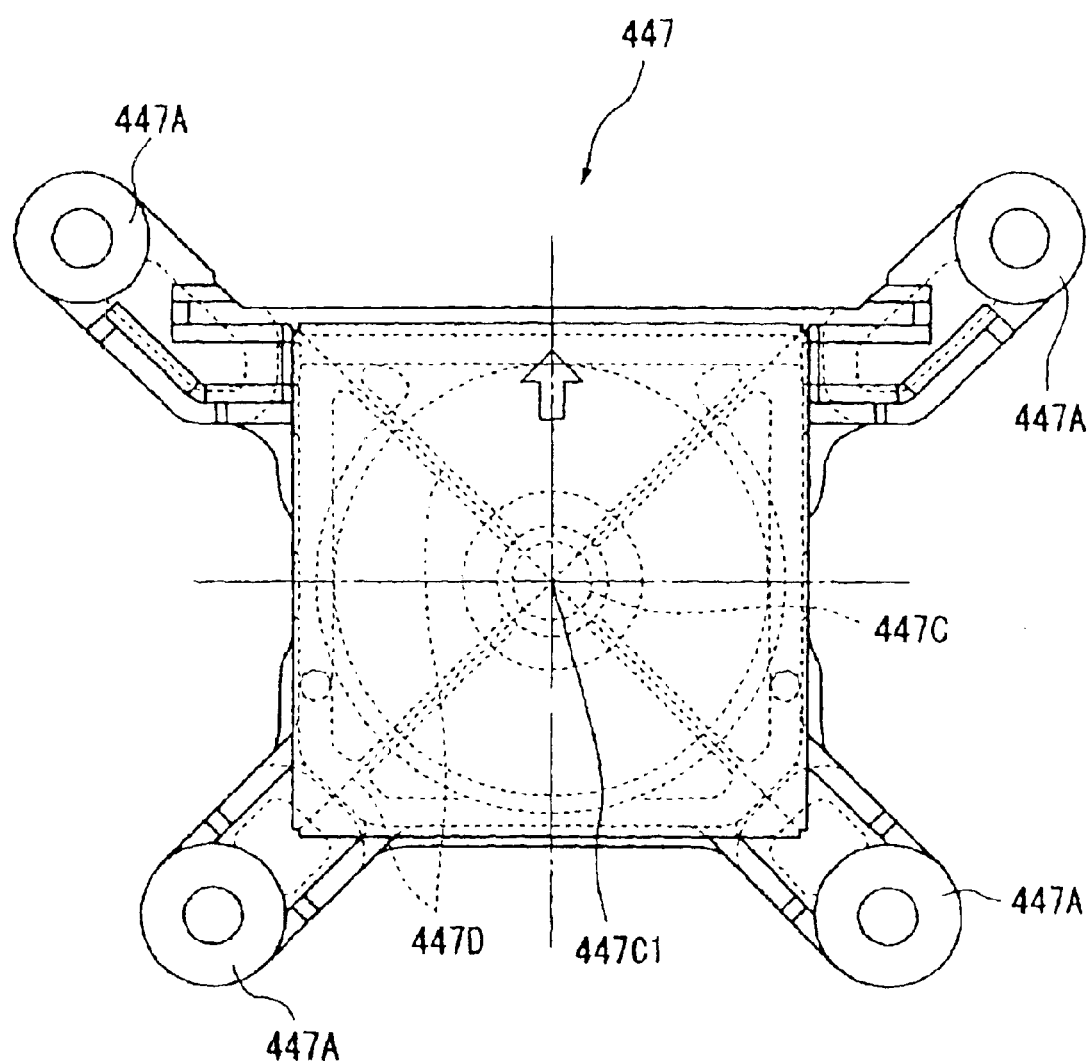
[FIG. 5]

[FIG. 6]
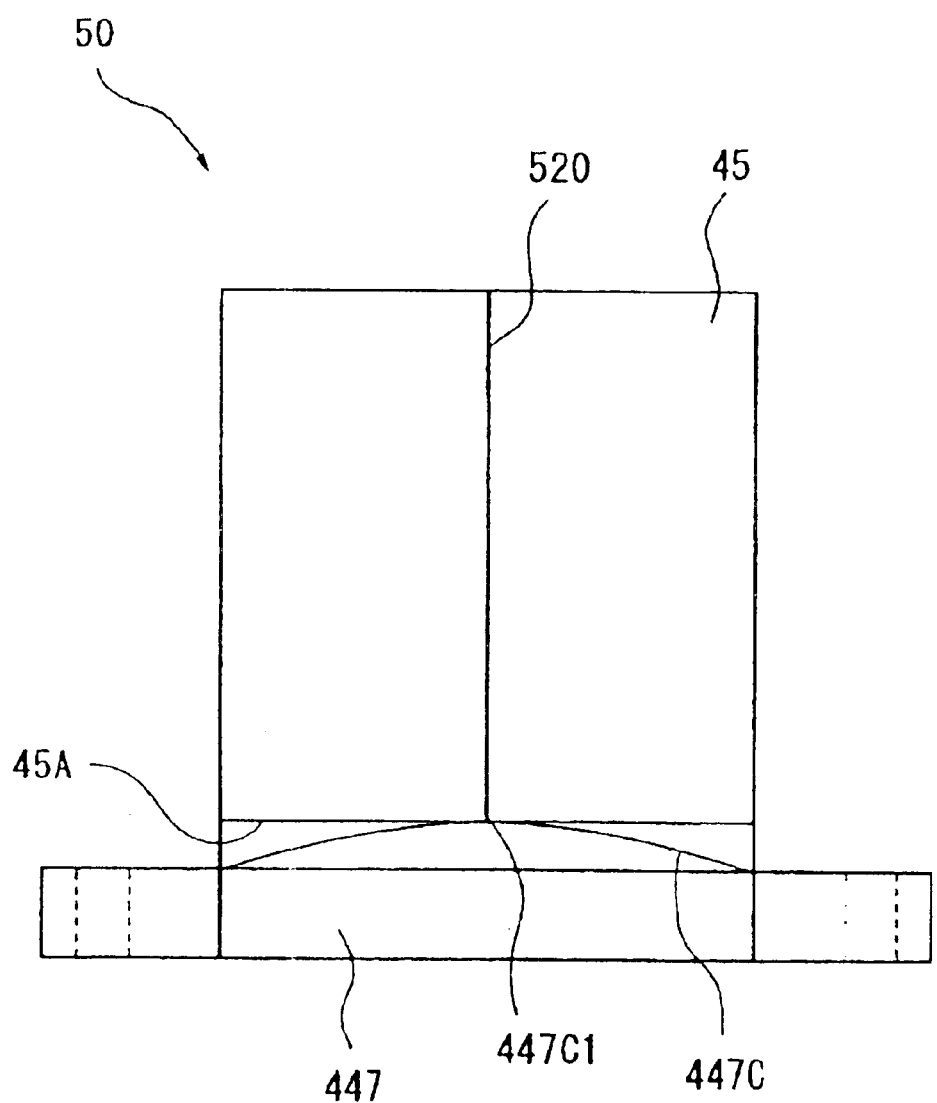

[FIG. 7]
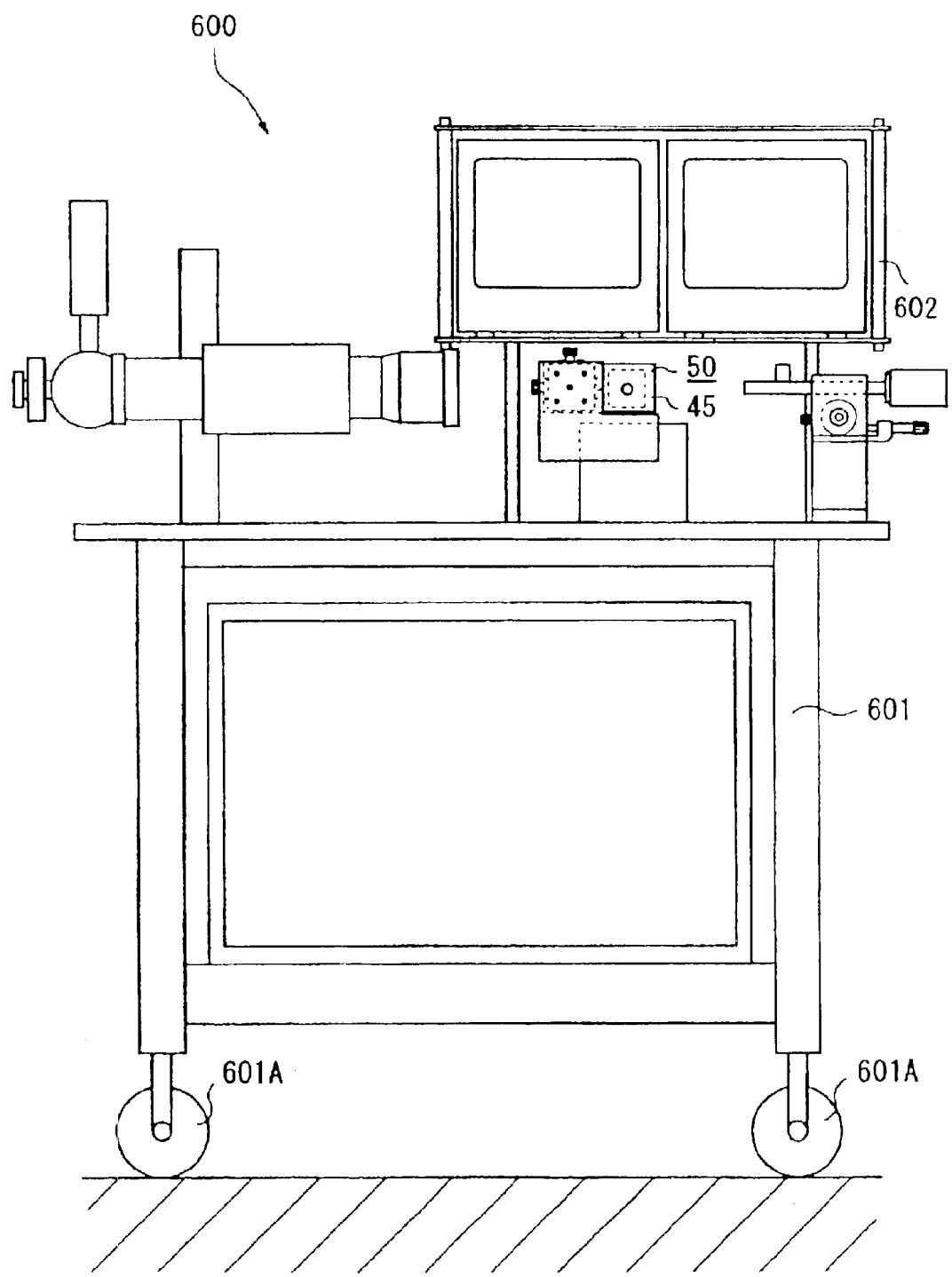

[FIG. 8]
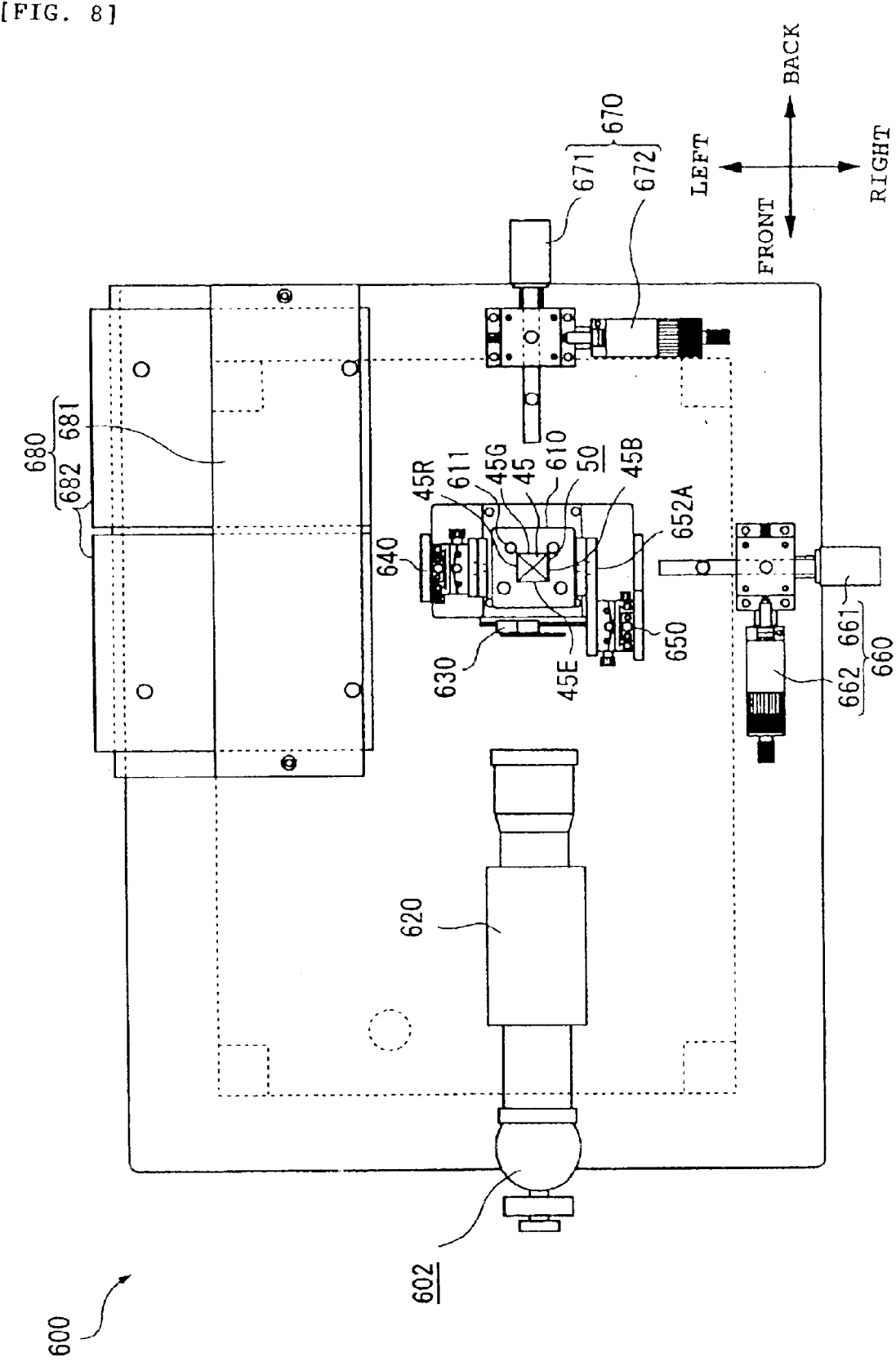

[FIG. 9]
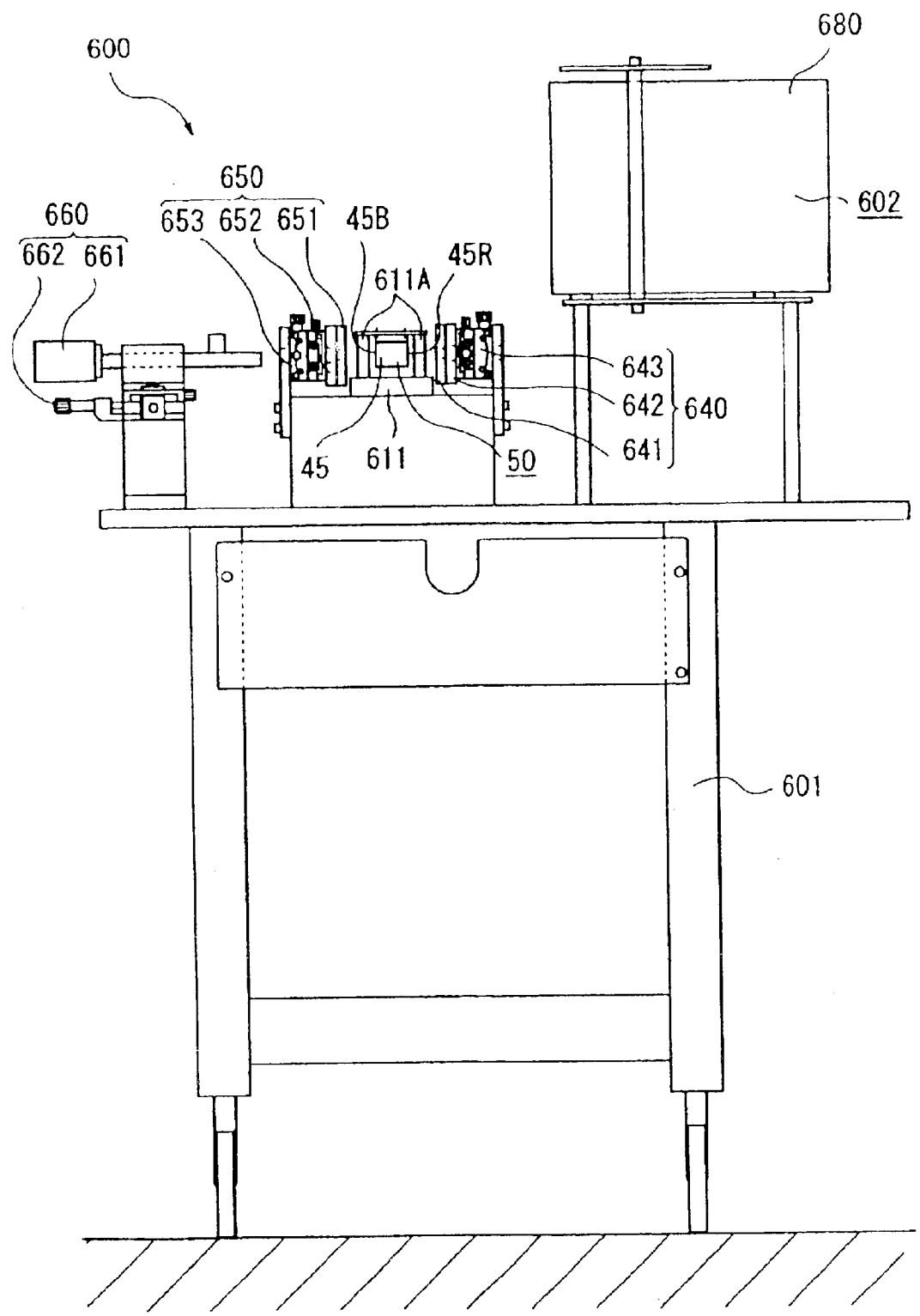

[FIG. 10]
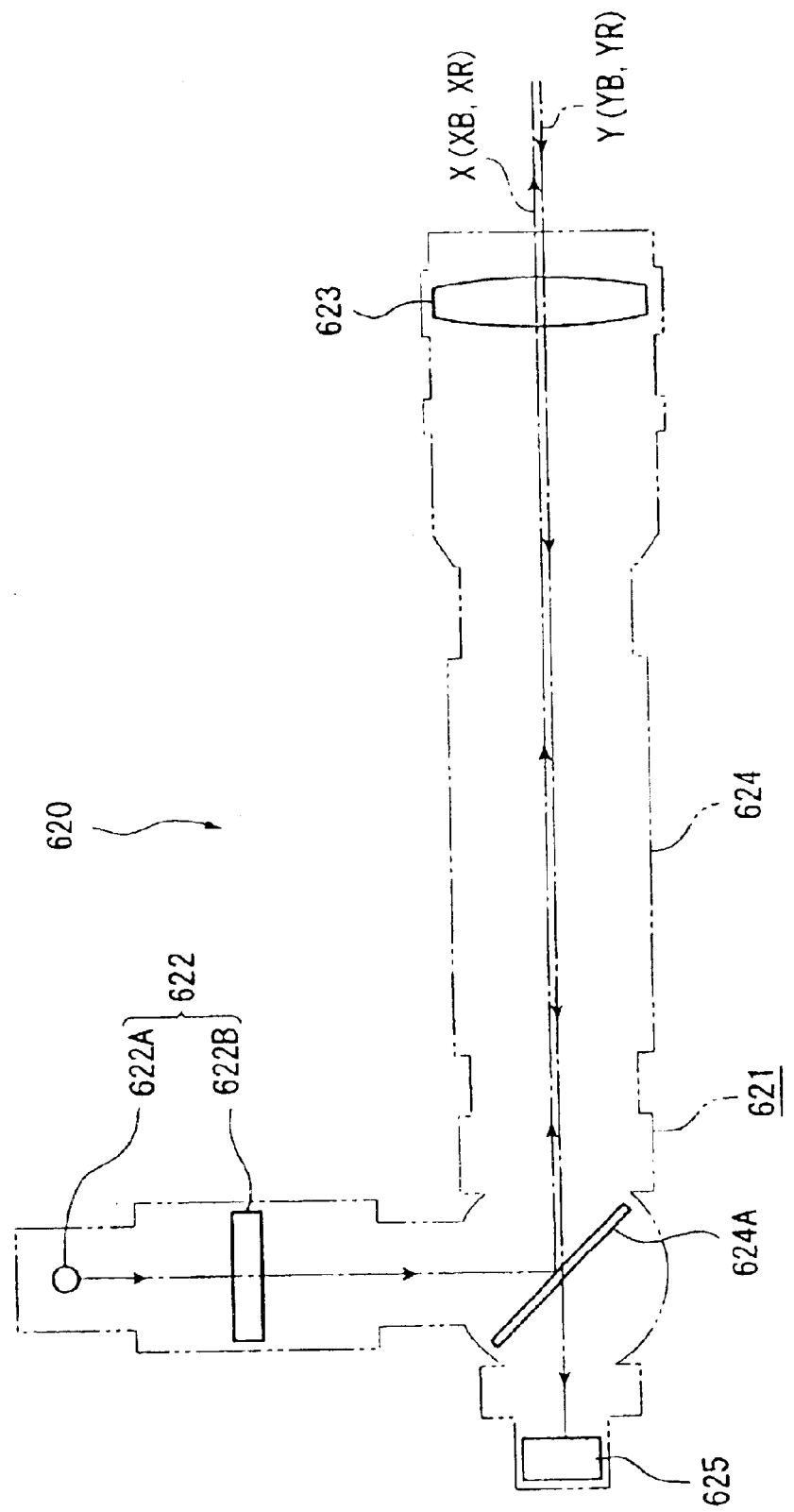

[FIG. 11]
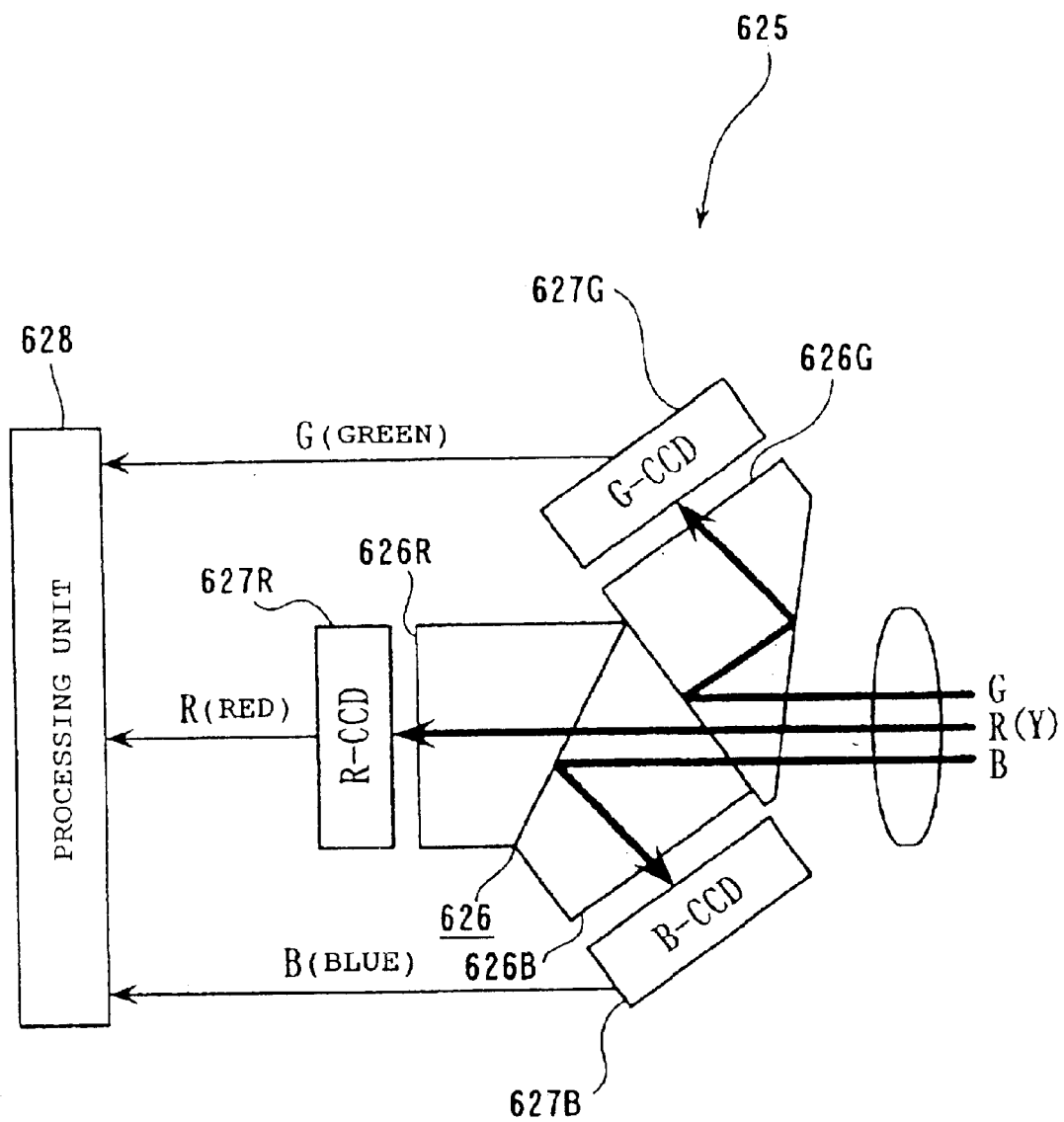

[FIG. 12]
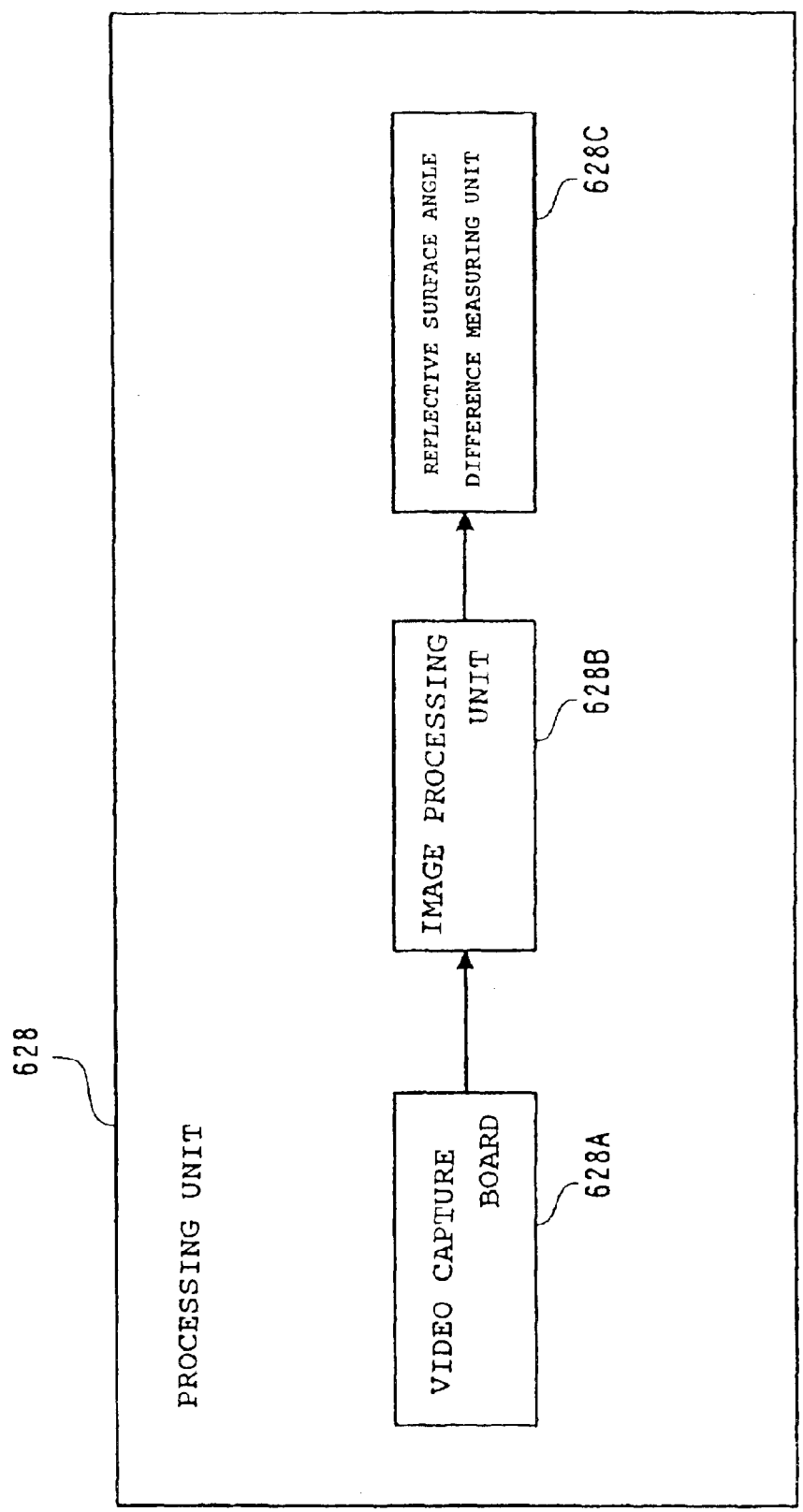

[FIG. 13]
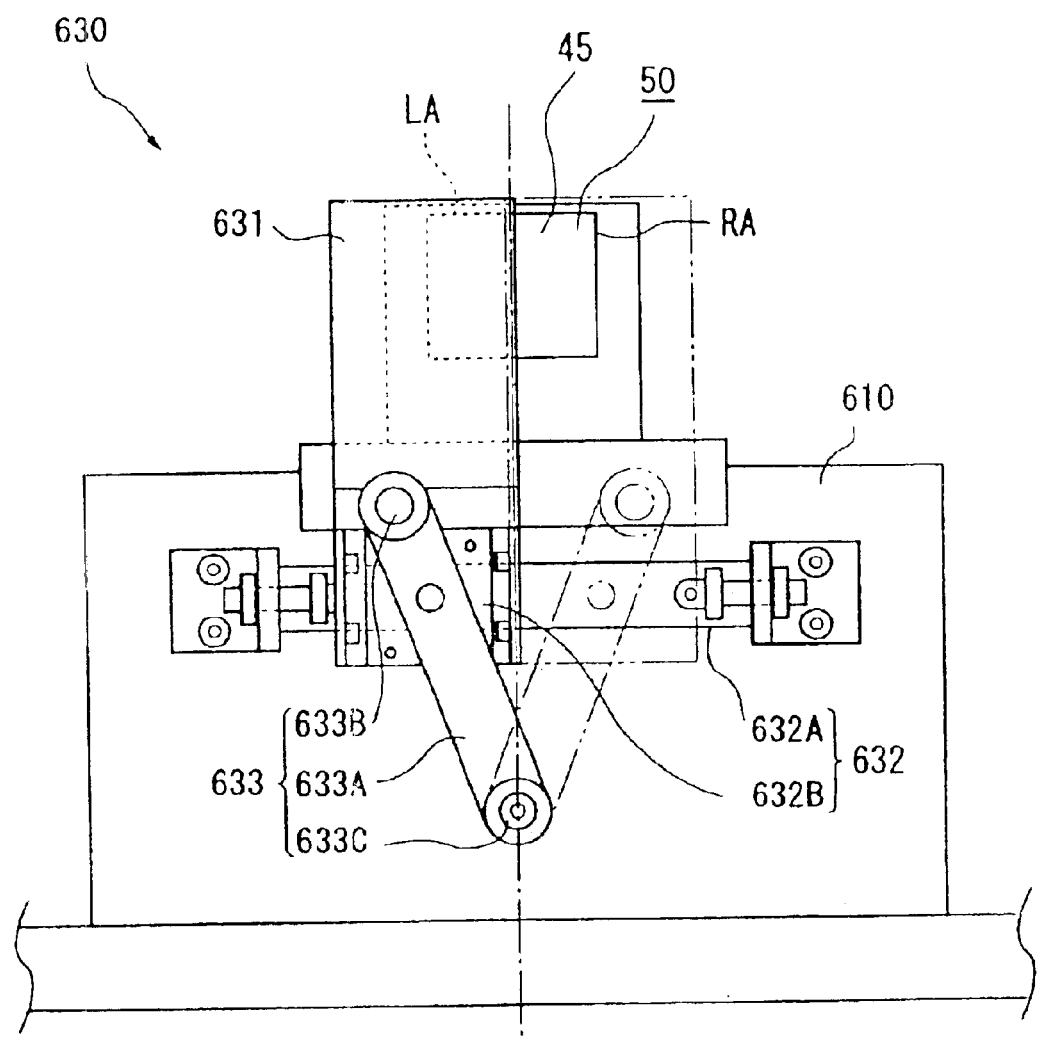

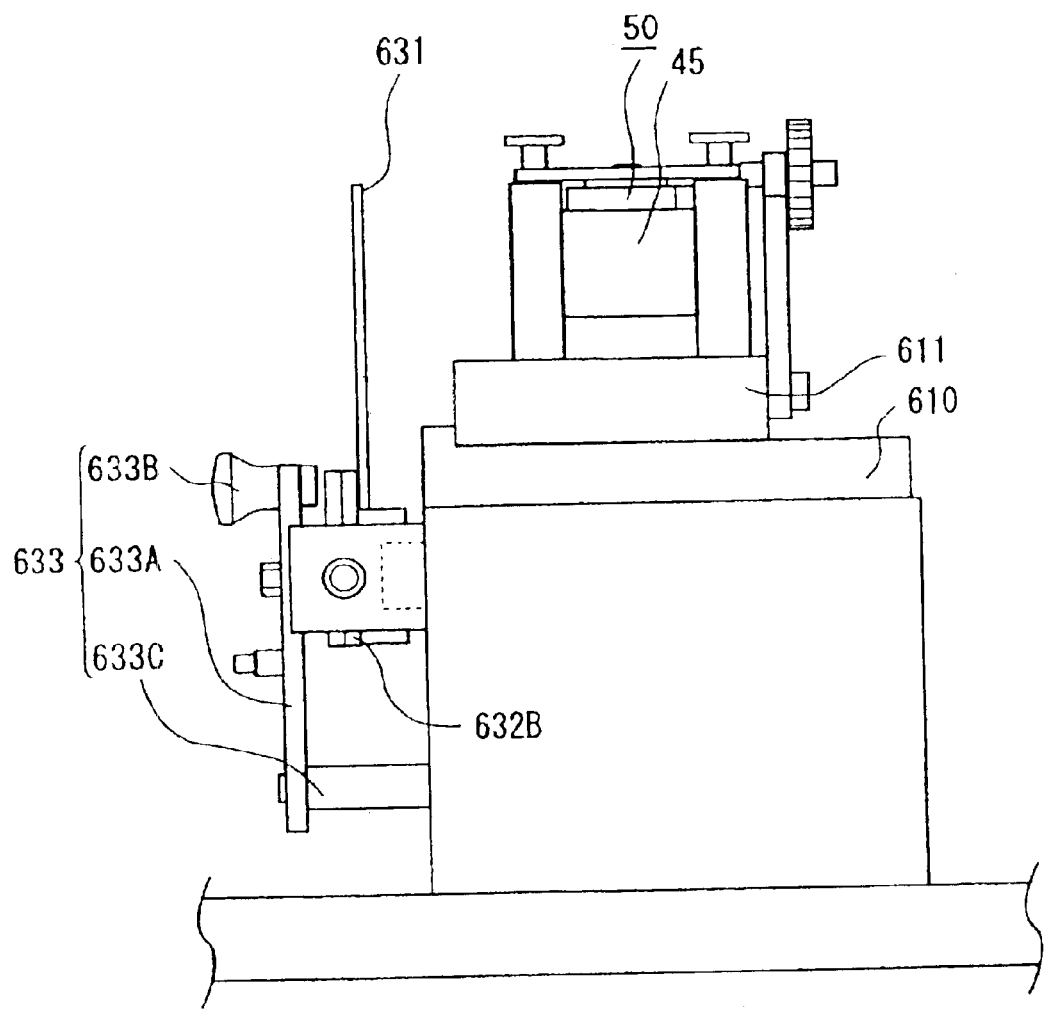
[FIG. 14]

[FIG. 15]
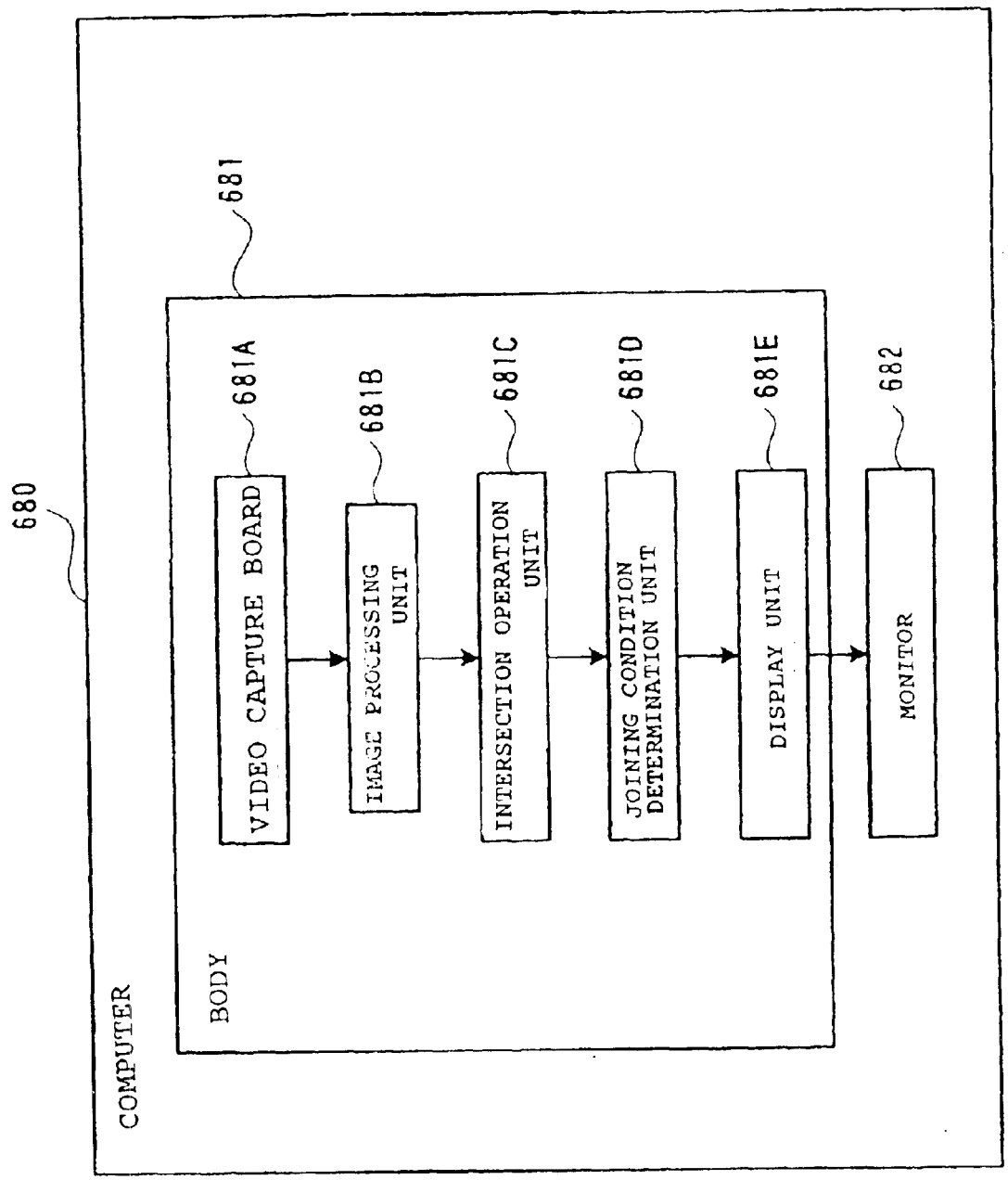

[FIG. 16]
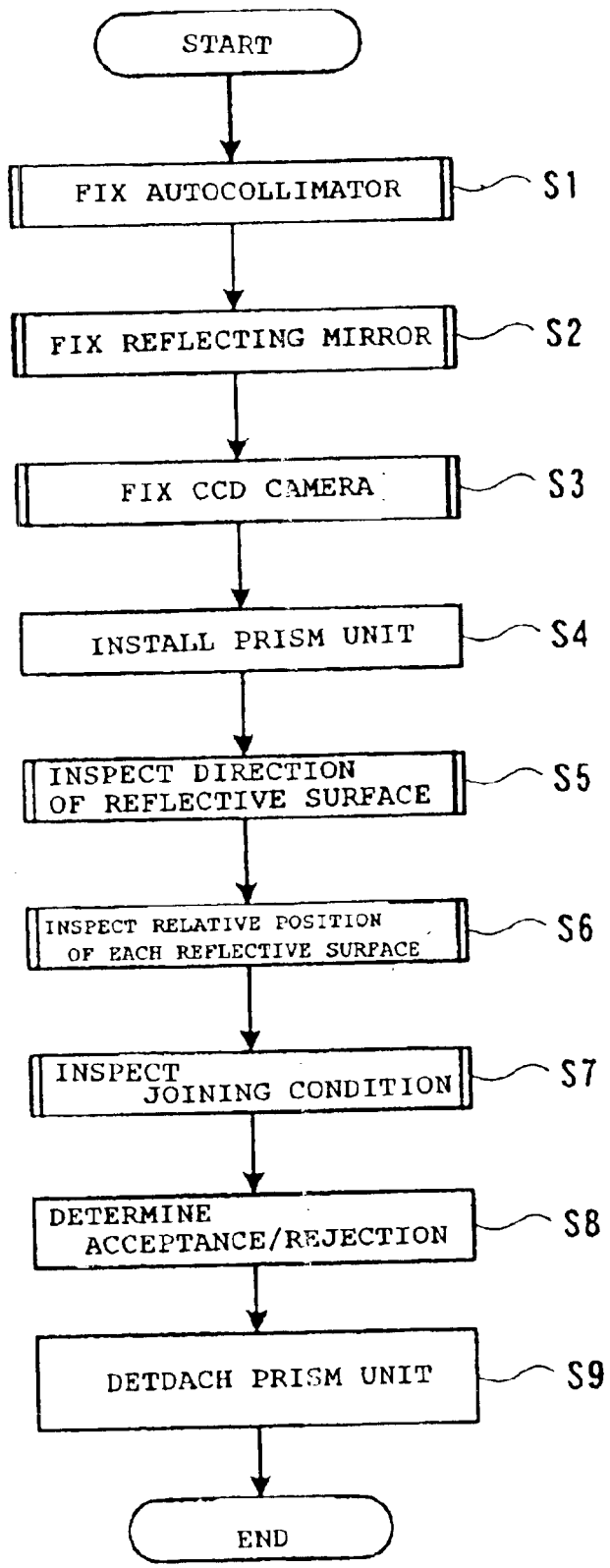

[FIG. 17]
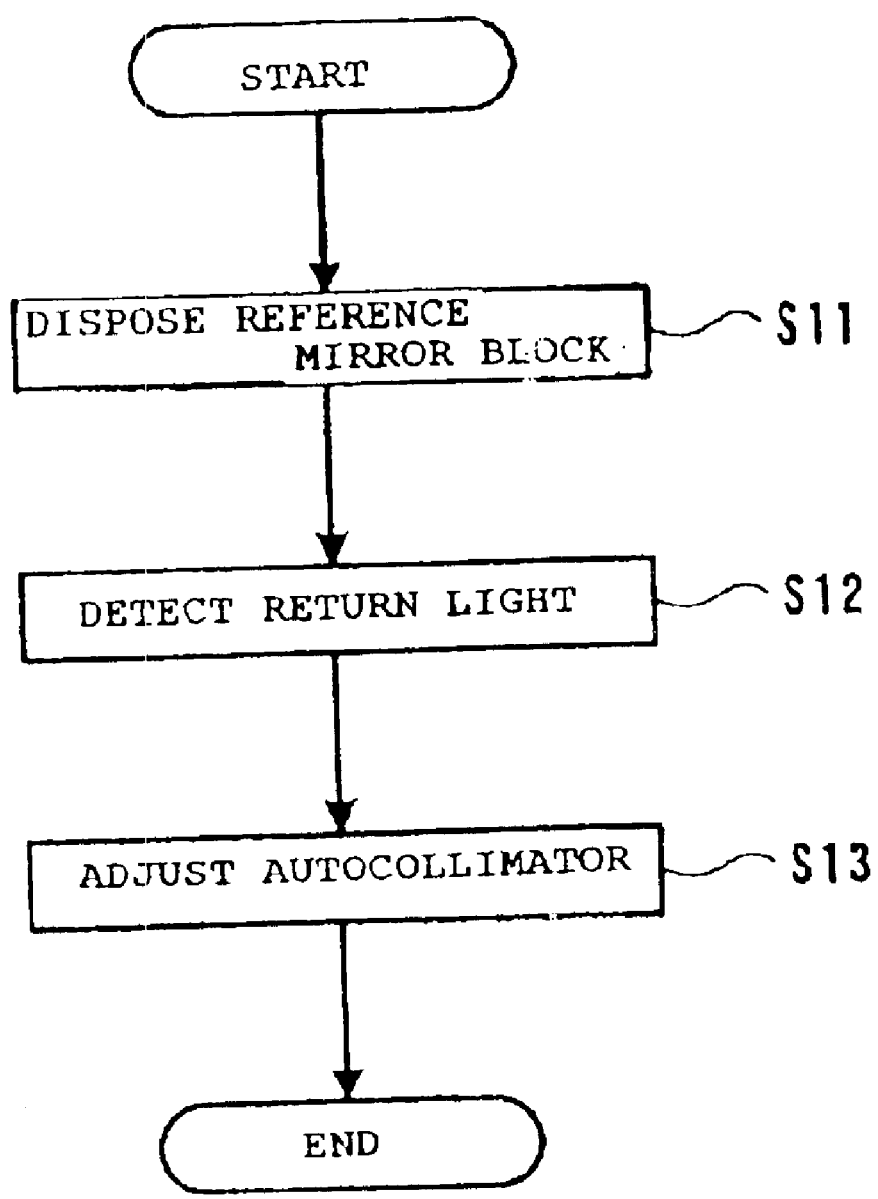

[FIG. 18]
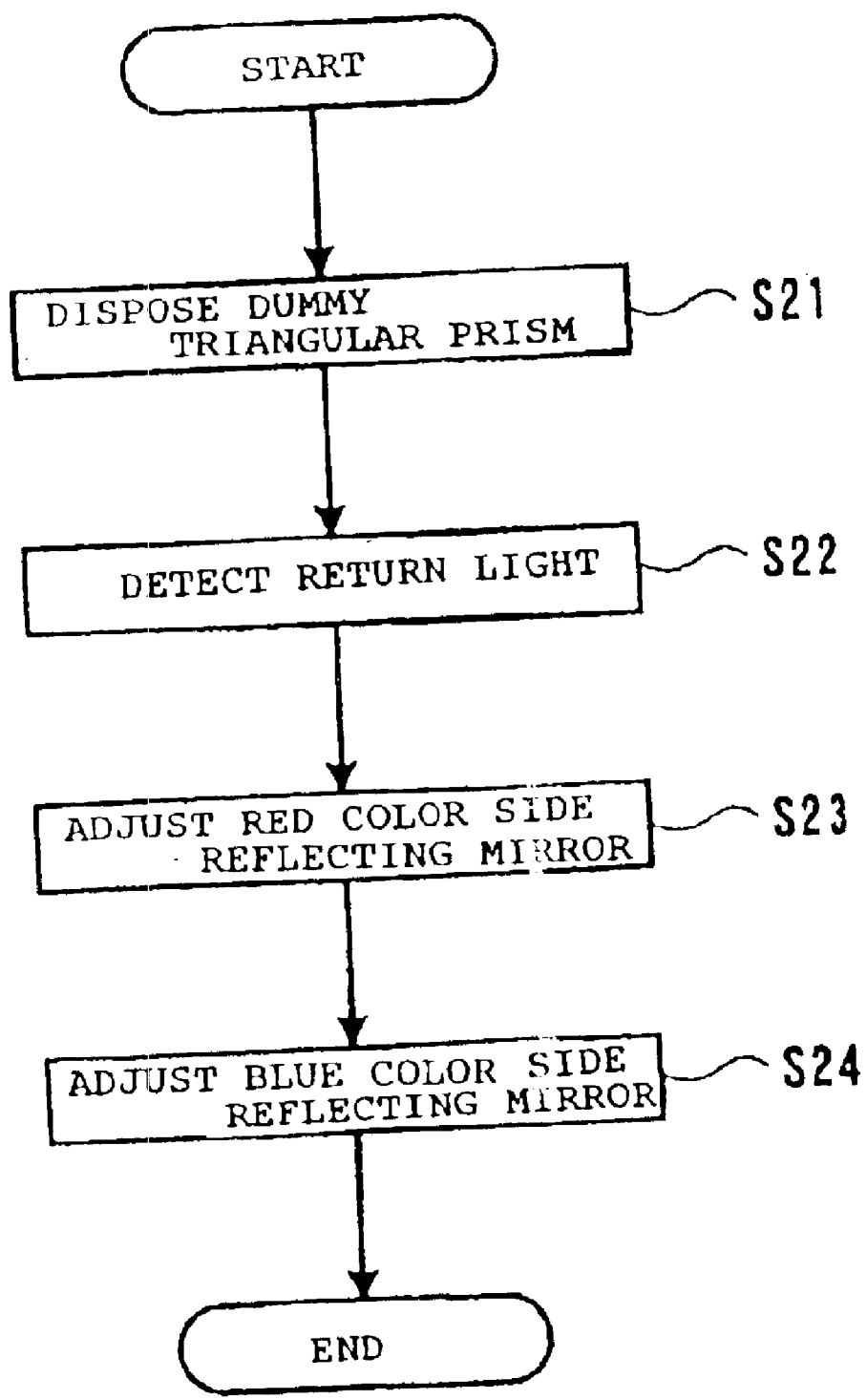

[FIG. 19]
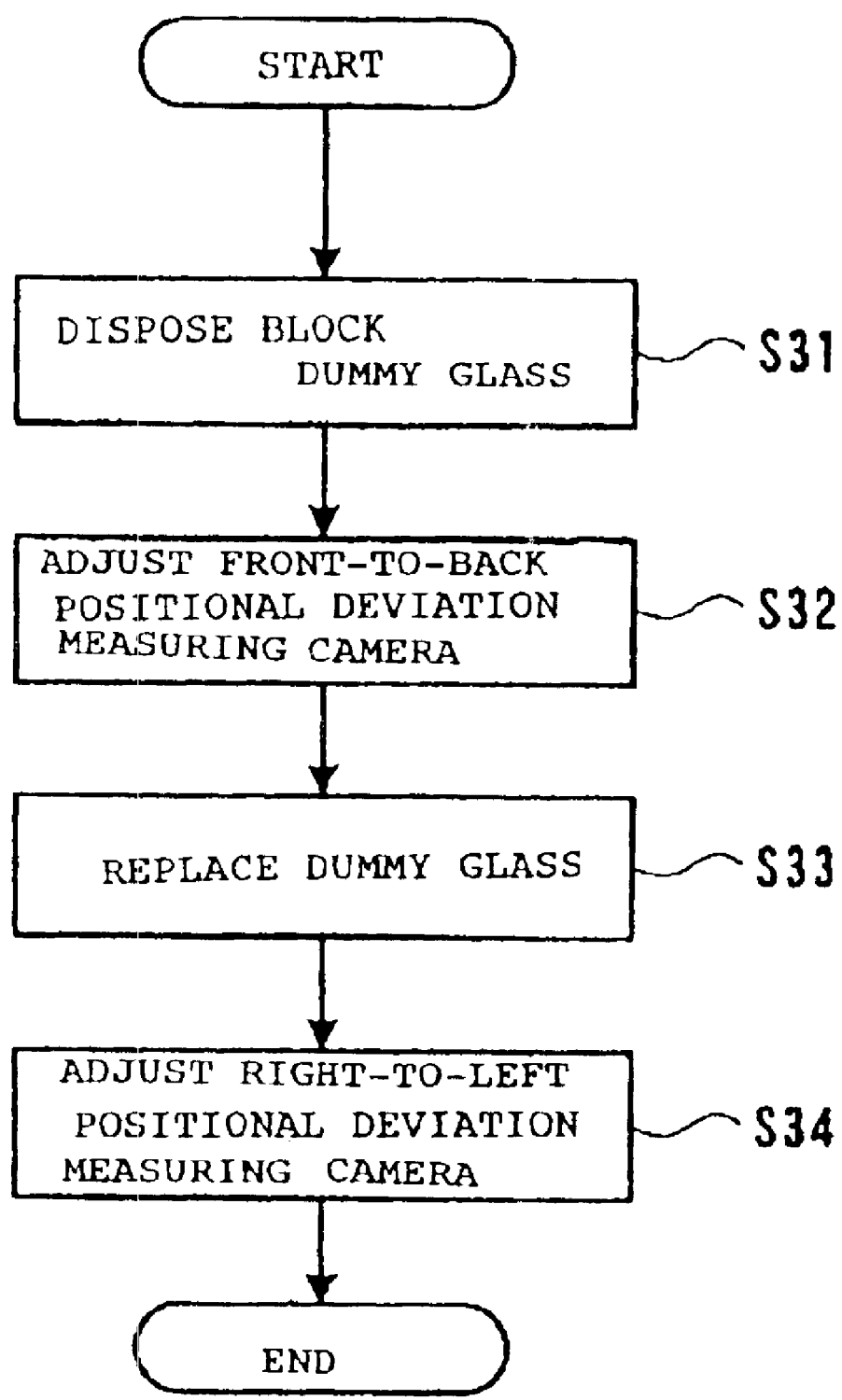

[FIG. 20]
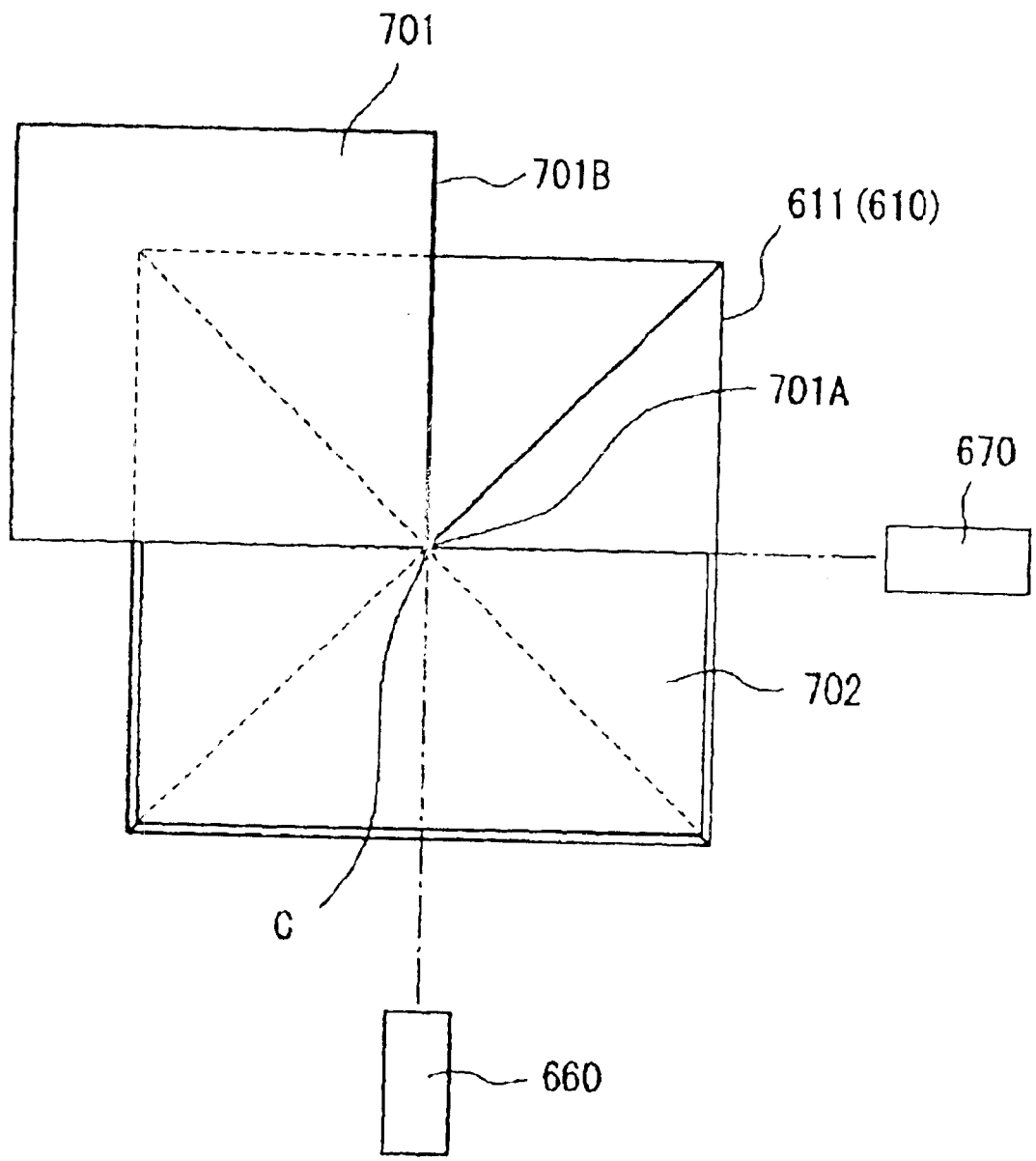

[FIG. 21]
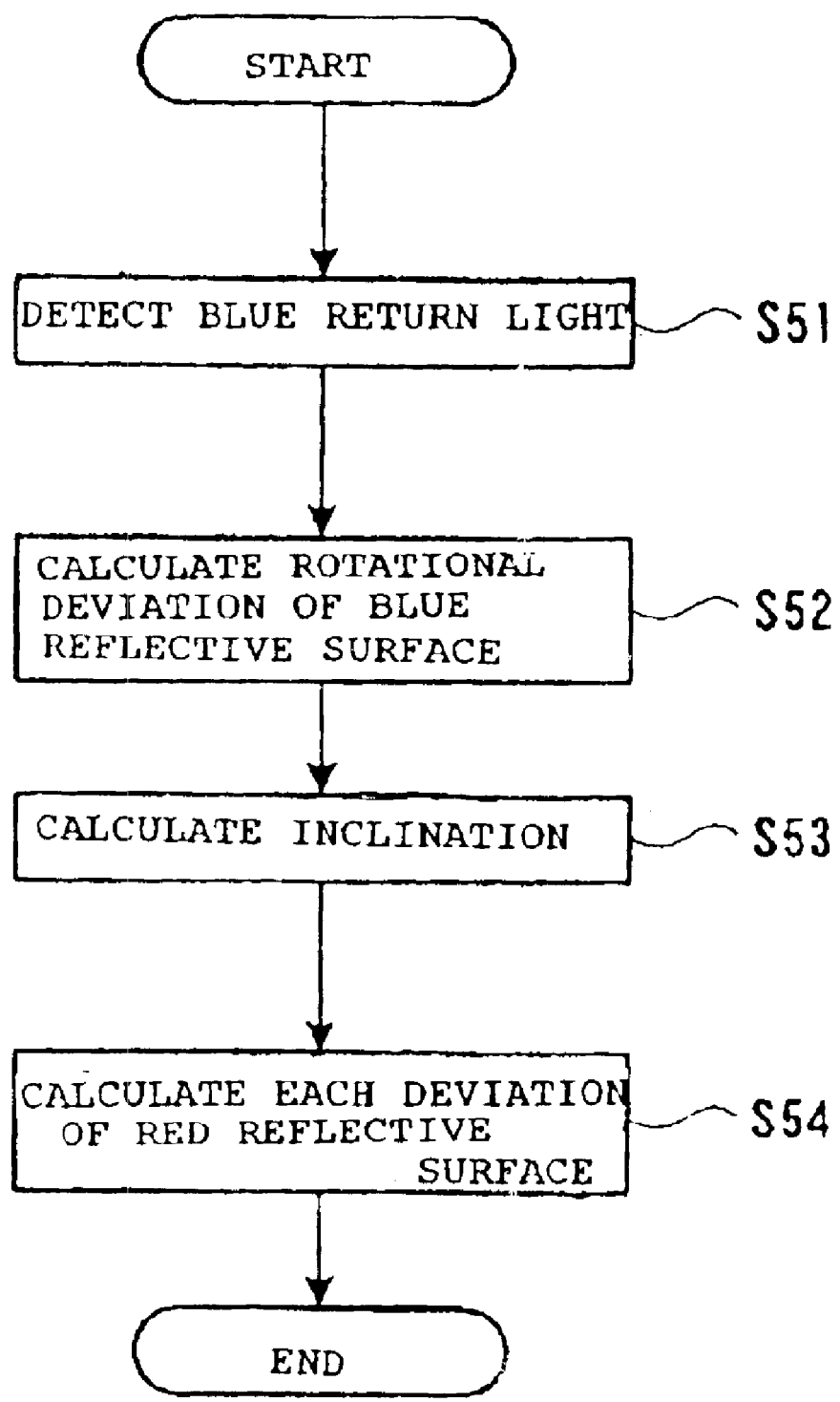

[FIG. 22]
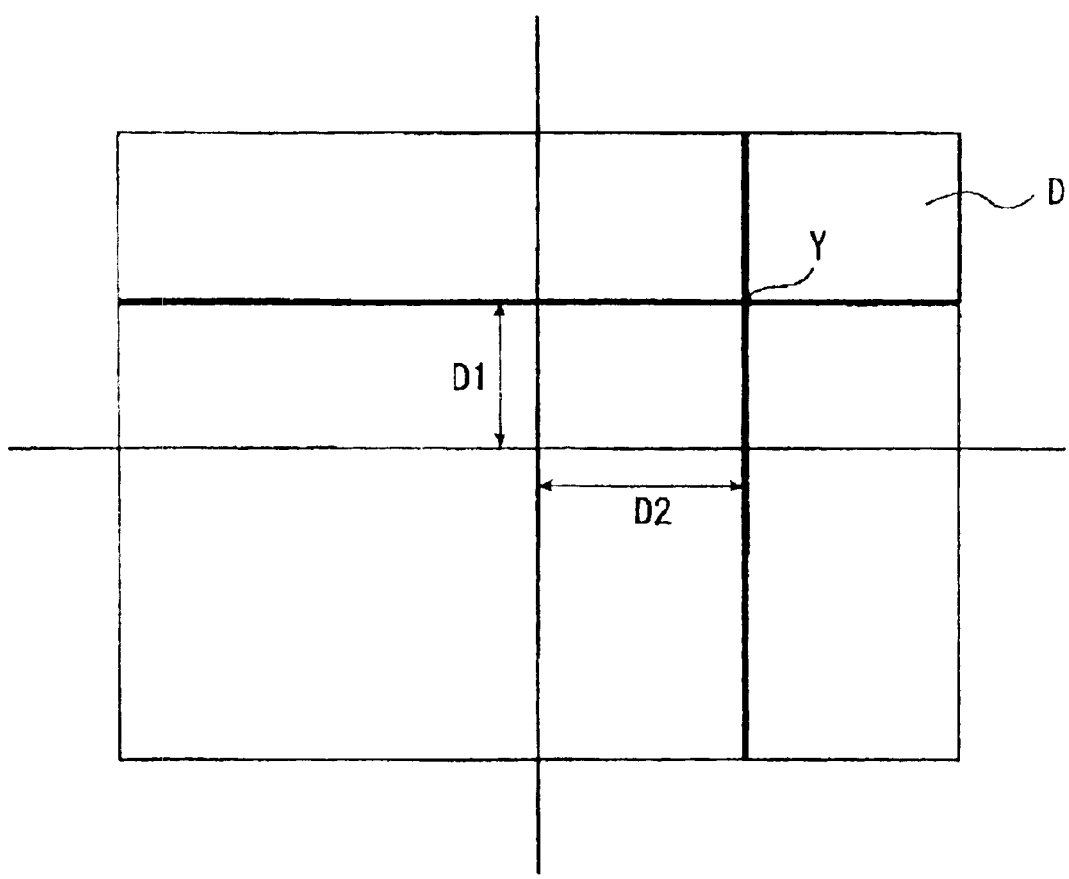

[FIG. 23]
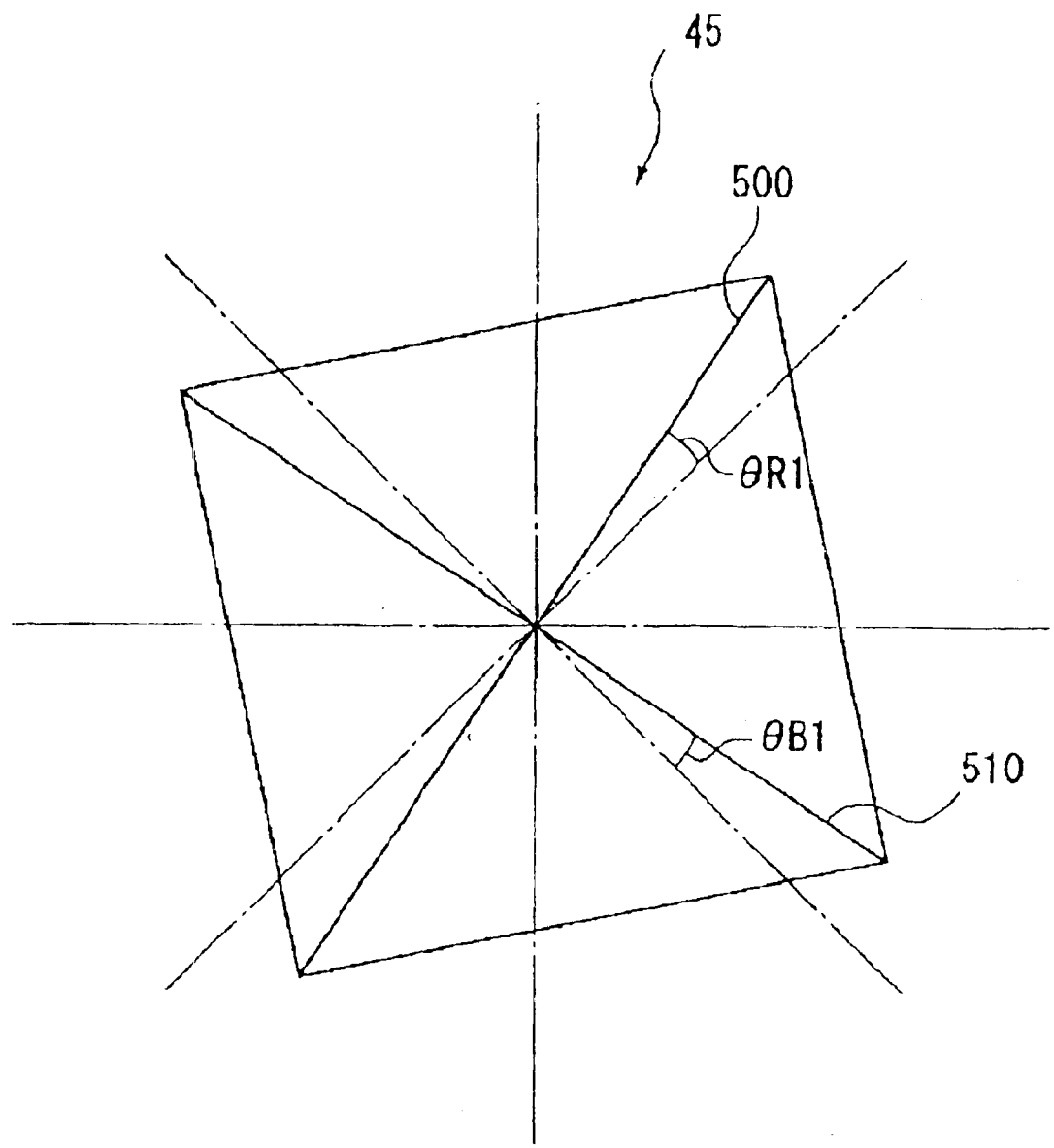

[FIG. 24]
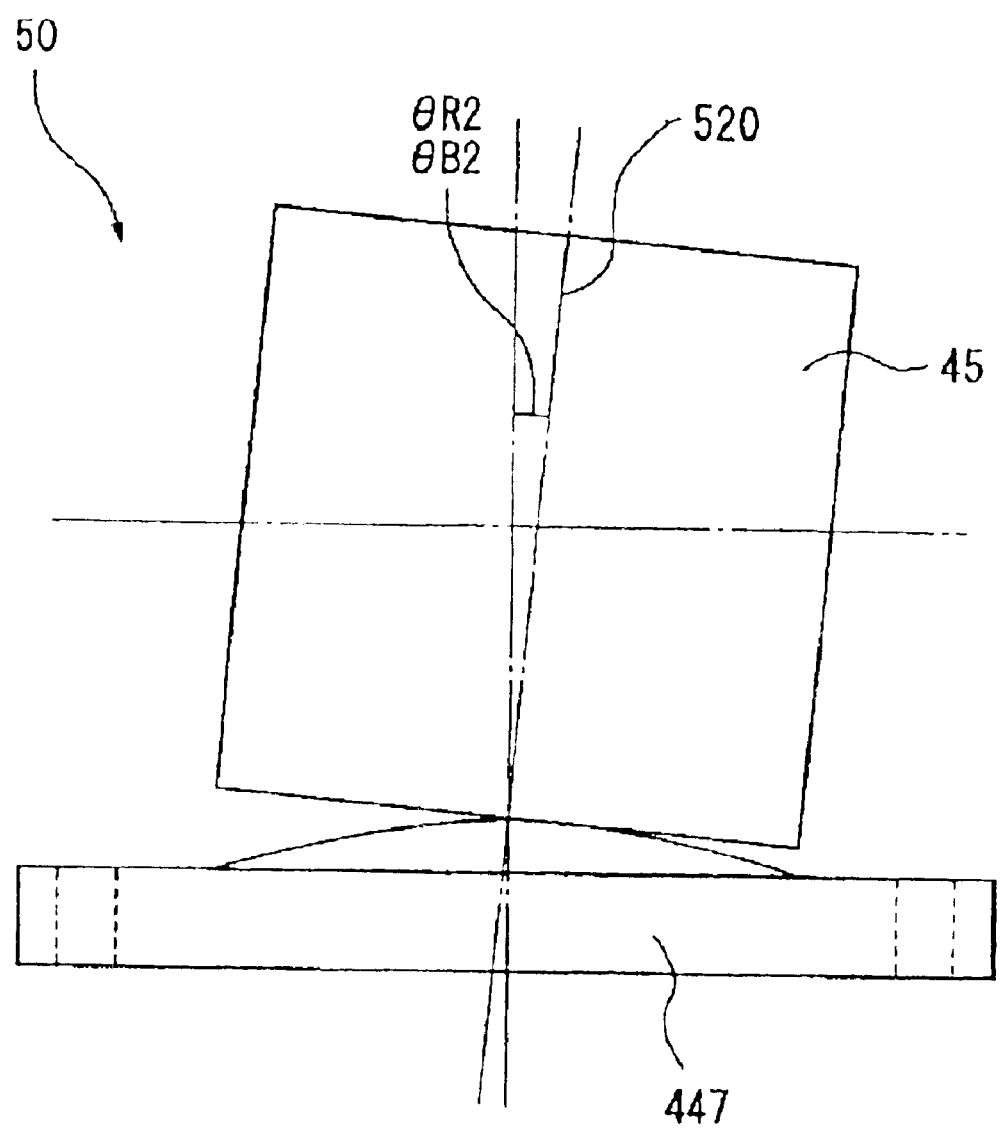

[FIG. 25]
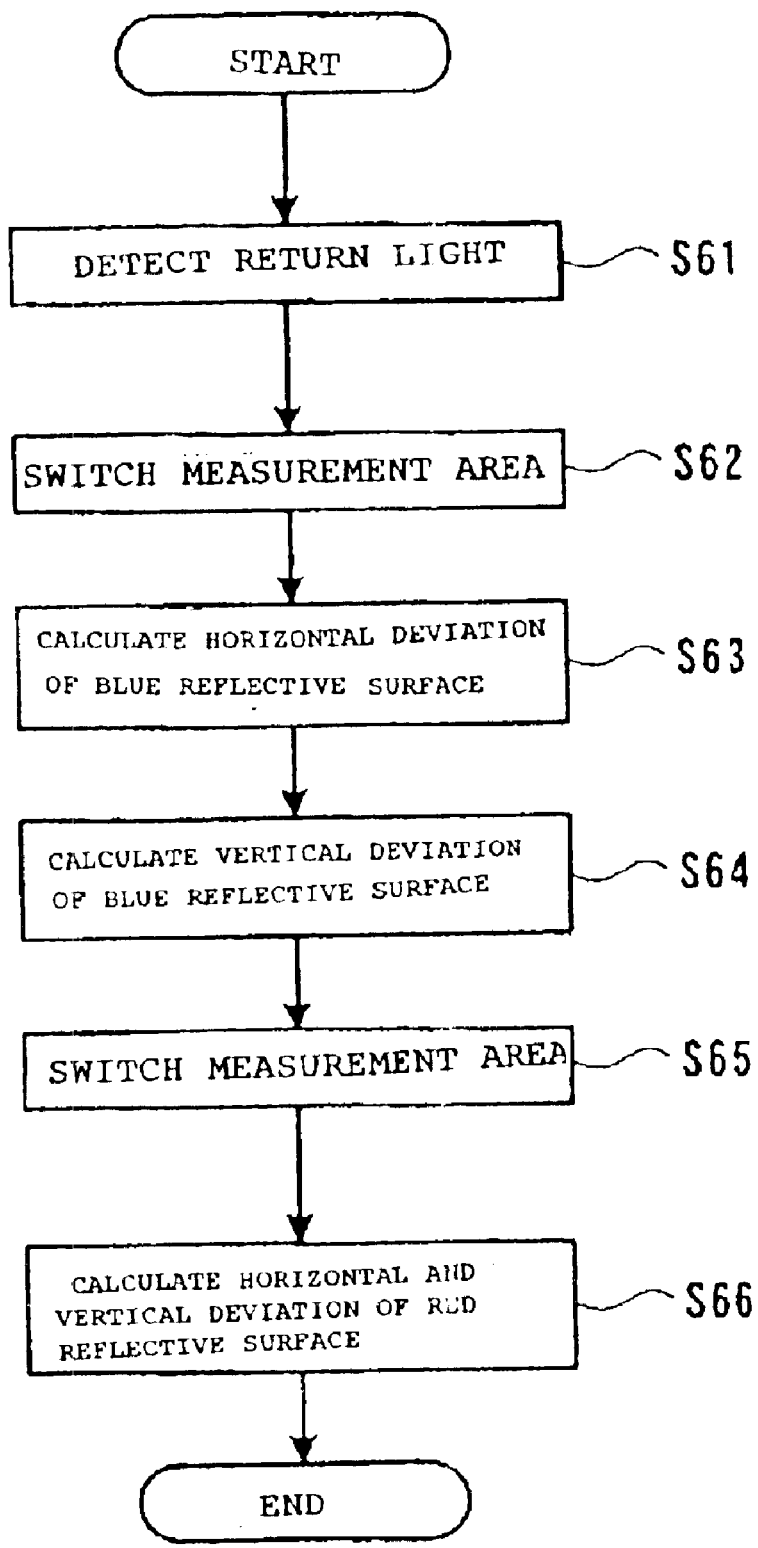

[FIG. 26]
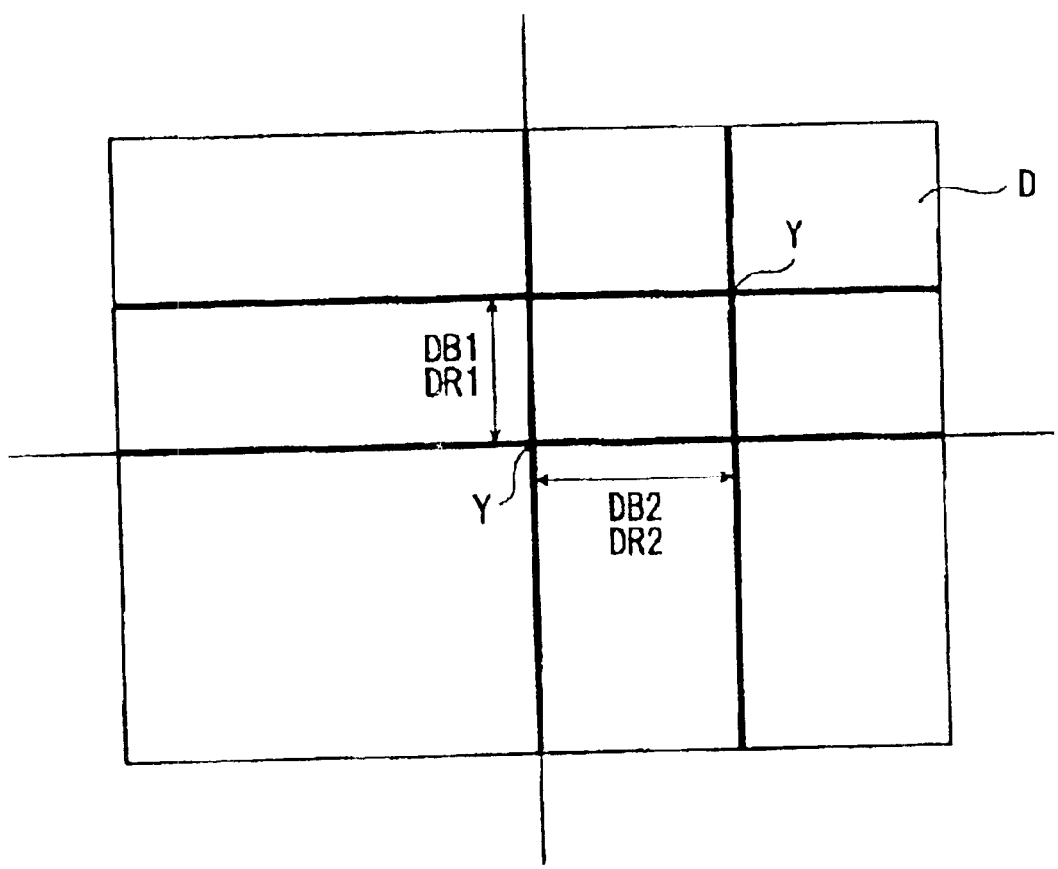

[FIG. 27]
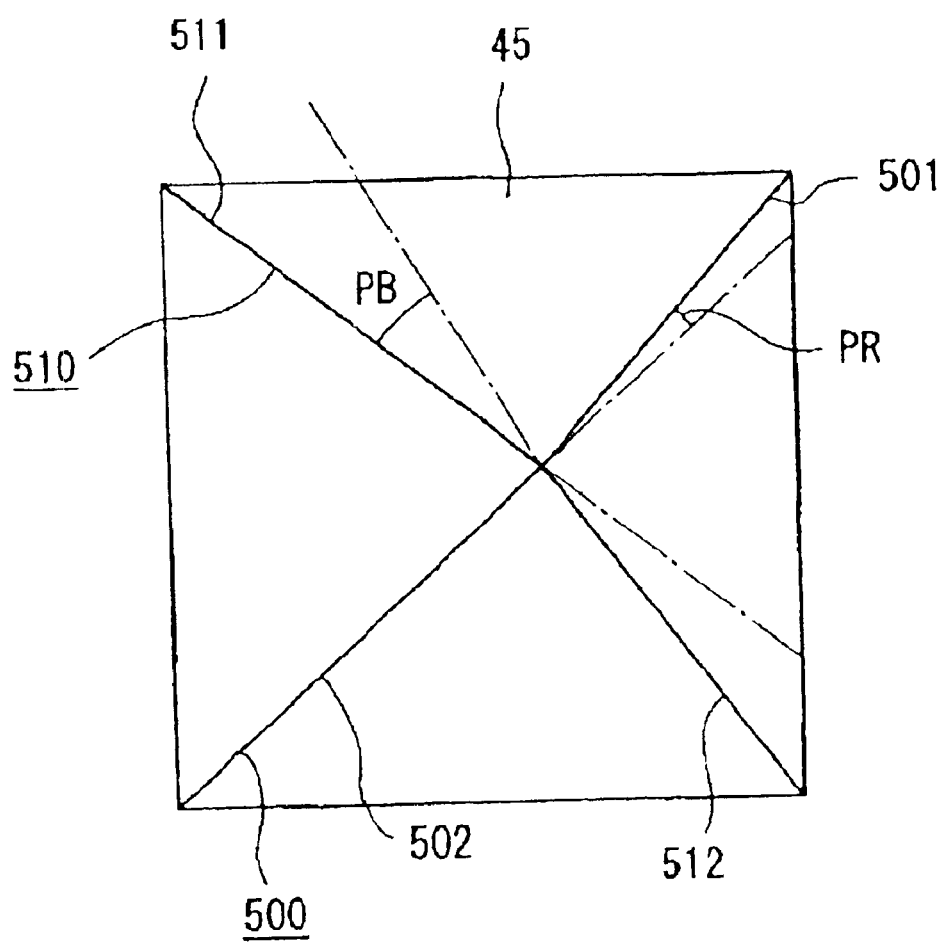

[FIG. 28]
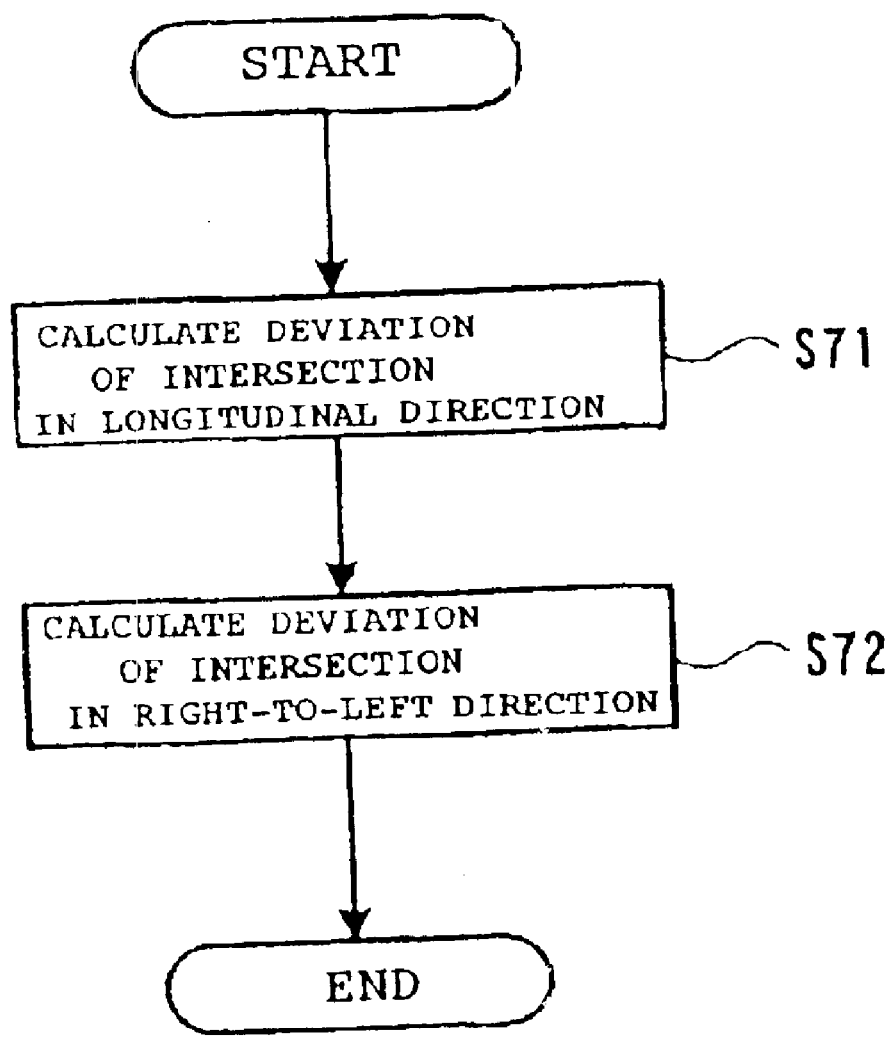

[FIG. 29]
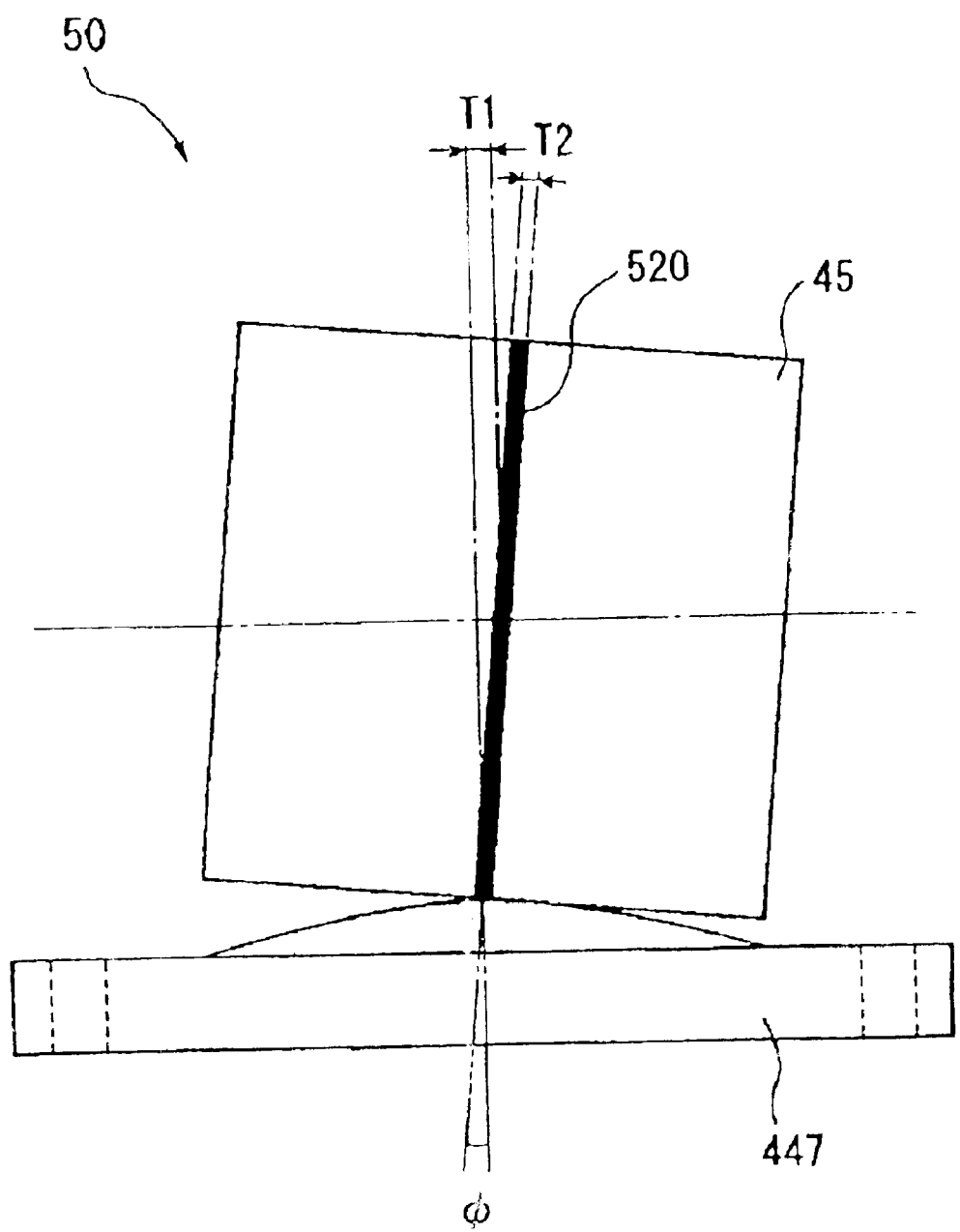

OPTICAL ELEMENT INSPECTION DEVICE AND OPTICAL ELEMENT INSPECTION METHOD

BACKGROUND OF THE INVENTION

1. Field of Invention

The present invention relates to an optical element inspection device and an optical element inspection method.

2. Description of Related Art

The related art includes a projector that includes a plurality of liquid crystal panels capable of modulating a plurality of color lights for each color light according to image information, a cross-dichroic prism for an optical element to synthesize the color lights modulated by each liquid crystal panel, and a projection lens to form a projected image by projecting the light beam synthesized by this cross-dichroic prism in an enlarging manner. Such a projector separates, for example, the light beam emitted from a light source into three color lights of RGB by a dichroic mirror, performs modulation according to image information for each color light by three liquid crystal panels, synthesizes the modulated light beam by a cross-dichroic prism, and projects a color image in an enlarging manner via the projection lens.

Such a cross-dichroic prism is a substantially cubic prism formed by affixing four rectangular prisms along each interface. In addition, a dielectric multi-layer film to reflect red light having a predetermined wavelength range is provided in a set of two reflective surfaces along the extending direction at four affixing surfaces, and a dielectric multi-layer film to reflect blue light having a wavelength range different from the above is provided in a set of the other two reflective surfaces along the extending direction. This means that four reflective surfaces are disposed in an X-shape inside the cross-dichroic prism.

Thus, in order to obtain a sharp projected image, each X-shaped reflective surface must reliably face the predetermined direction with respect to each liquid crystal panel. Therefore, in the related art, the cross-dichroic prism is fixed to a fixing member with high accuracy for unification based on the intersection formed by butting the contour dimension of the cross-dichroic prism against an end of each rectangular prism, i.e., the intersection of the reflective surface to reflect red light with the reflective surface to reflect blue light, and, accommodated in the projector together with this unit to specify the direction of each reflective surface.

SUMMARY OF THE INVENTION

However, in such a method, the cross-dichroic prism is only adjusted by the contour standard though the position of the cross-dichroic prism with respect to each liquid crystal panel can be adjusted. A problem occurs in that any relative positional deviation between each reflective surface inside the cross-dichroic prism cannot be inspected.

Such a problem occurs not only in the above cross-dichroic prism, but also in other optical elements, such as affixed mirrors having reflective surfaces.

The present invention provides an optical element inspection device and an optical element inspection method capable of inspecting the relative position of each reflective surface in an optical element.

The optical element inspection device of the present invention inspects the relative position of each reflective surface of the optical element having four reflective surfaces disposed in X-shape so as to form the angle of incidence of 45°when viewed in the direction orthogonal to the optical axis of the incident light beam so that one set of reflective surfaces along one X-shaped extending direction reflect the light beam of the wavelength range different from that of the other set of reflective surface. The device includes a pedestal on which the optical element to be inspected is installed, a measurement light introduction unit to introduce the measurement light at the angle of incidence of 45° with respect to either of the above four reflective surfaces, a return light detection unit to detect the return light of the measurement light introduced in the above optical element from this measurement light introduction unit, and a measurement light switching unit to introduce the measurement light only in either area of two areas demarcated by the intersection of one set of the reflective surfaces with the other set of reflective surfaces when viewed in the introducing direction of the measurement light.

In the present invention, the inspection is performed, for example, by the following procedure.

Firstly, the optical element to be inspected is installed on the pedestal, and the measurement light is only introduced in either area of two areas demarcated by the intersection at the angle of incidence of 45° from the measurement light introduction unit. Then, the return light of the measurement light introduced in the reflective surface of one area from this measurement light introduction unit is detected by a return light detection unit. Next, the measurement light is only introduced in the other area of the two areas demarcated by the intersection by a measurement light switching unit, and similarly to the above, the return light of the measurement light introduced in the reflective surface of the other area from the measurement light introduction unit is detected by the return light detection unit.

Then, the relative position between the two reflective surfaces in one set is inspected by comparing the results of detection of the return light from each reflective surface with each other in one set of the reflective surfaces along the extending direction, and acquiring the deviation thereof. Similarly, in the other set of reflective surfaces along the extending direction, the deviation is acquired, and the relative position between the other set of two reflective surfaces is also inspected.

In such an inspection system, the relative position between the two reflective surfaces in each set can be inspected easily. Thus, the acceptance or rejection determination accuracy of the optical element can be enhanced. Further, the projected image of the projector can be sharp by building the optical element determined to be acceptable in such an inspection in the projector or the like.

In such an optical element inspection device, the measurement light introduction unit and the return light detection unit are preferably integrated with each other for an autocollimator.

In such a configuration, the measurement light introduction unit and the return light detection unit form one appliance for the integrated autocollimator, and the optical element inspection device can be miniaturized in comparison with a case in which measurement light introduction unit and the return light detection unit are disposed separately from each other.

The optical element inspection device preferably includes a reflecting member which reflects the light beam reflected by the reflective surface and introduces it in the return light detection unit as the return light.

In this configuration, the light beam reliably reflected by the reflecting member forms the return light, and in comparison with a case in which the light beam reflected by, for example, an end fare of a prism forms the return light, the return light can be brighter, and easily detected by the return light detection unit.

In addition, the return light detection unit preferably includes a color separation optical system to separate the return light into a plurality of color lights, and a plurality of image pickup elements according to each color light separated by this color separation optical system.

A CCD (Charge Coupled Device), etc., can be employed for the image pickup element.

In such a configuration, the return light including light beams of different wavelength ranges is automatically detected substantially at the same time by separating the return light into each color light by the color separation optical system, and picking up the image for each separated color light by each image pickup element.

Since the return light is thus detected, the return light can be more reliably and automatically detected than the configuration in which the return light is visually detected, and the burden on operators can be reduced.

There is another configuration in which a plurality of color filters that include each color (of the predetermined wavelength range) are prepared in place of the above configuration, the return light from the optical element is successively passed through these color filters, and the return light is detected by the return light detection unit for each color light. However, the return light can be more easily detected in the configuration in which the color separation optical system and the image pickup element are employed, as described above, since the color filter need not be replaced.

The optical element inspection device including the color separation optical system and the image pickup element preferably includes an image take-in unit to take in the signal detected by the image pickup element, and a reflective surface angle difference measurement unit which performs the image processing of the image signal taken in by this image take-in unit, and measures the angle formed by the one set of reflective surfaces or the other set of reflective surfaces.

In this configuration, the return light is detected by the image pickup element, the detected signal is taken in by the image take-in unit, and the image of this taken-in image signal is processed by the image processing unit.

Then, the angle formed between two reflective surfaces in each set is measured by the reflective surface angle difference measurement unit based on the position of each image-processed return light at two reflective surfaces in each set, and the angular deviation between the two reflective surfaces in each set can be easily and automatically inspected by only setting the acceptable angular range in advance.

The above optical element inspection device preferably includes an intersection image pickup unit to pick up an image of the intersection of the reflective surfaces of the one set with the reflective surfaces of the other set, and a joining condition determination unit to determine the joining condition of each reflective surface from the width and the inclination of the intersection based on the signal detected by this intersection image pickup unit.

Here, the joining condition of each reflective surface means a condition of the relative position between the reflective surfaces including how much two reflective surfaces are deviated in translation in the direction orthogonal to the extending direction, and how much two reflective surfaces are inclined from the direction normal to the optical axis.

As described above, the width of the intersection is measured by the intersection image pickup unit, and even when the two reflective surfaces in each set are deviated in translation, the deviation for this translation can be easily inspected. In addition, the inclination of the intersection is measured by the intersection image pickup unit, and the deviation of this inclination can be easily inspected even when the two reflective surfaces in each set are deviated in inclination from the reference axis normal to the optical axis of the incident light beam. Automatic inspection can be easily performed by only presetting the acceptable range of the width and the inclination.

The optical element inspection method of the present invention is an optical element inspection method to inspect the relative position of each reflective surface of an optical element having four reflective surfaces disposed in X-shape so as to form the angle of incidence of 45° when viewed in the direction orthogonal to the optical axis of the incident light beam with one set of reflective surfaces along one extending direction of a letter X reflecting the light beam of the wavelength range different from that of the other set of reflective surfaces. The method includes a measurement light introducing procedure of introducing the measurement light at the angle of incidence of 45° in either reflective surface of the optical element to be inspected, a return light detecting procedure of detecting the return light of the measurement light introduced in the optical element by this measurement light introducing procedure, a measurement light switching procedure of switching the measurement light into another reflective surface along either reflective surface, and introducing it, and a deviation detecting procedure of detecting the return light of the switched measurement light, and detecting the deviation of the other reflective surface with respect to either reflective surface.

In the present invention, the inspection is performed in the following procedures described below.

Firstly, the optical element to be inspected is installed, and the measurement light is introduced only in either reflective surface at the angle of incidence of 45° by the measurement light introducing procedure. Then, the return light of the measurement light introduced in either reflective surface is detected by the return light detecting procedure.

Next, the measurement light is introduced only in the other reflective surface along the either reflective surface by the measurement light switching procedure. Subsequently, the deviation of the other reflective surface with respect to either reflective surface is detected based on the result of detection of the switched measurement light and the result of detection by the return light detecting device by the deviation detecting procedure.

In this inspection, the relative position between two reflective surfaces along the extending direction can be easily inspected, and acceptance or rejection of the optical element can be determined with high accuracy. In addition, the projected image of the projector can be sharpened by building the optical element that is determined to be acceptable by the inspection of the projector or the like.

The above optical element inspection method preferably includes an intersection image acquiring procedure of acquiring an image of the intersection of the one set of reflective surfaces with the other set of reflective surfaces, and a joining condition determining procedure of determining the joining condition of each reflective surface from the width and the inclination of the intersection.

In this configuration, automatic inspection can be easily performed by only installing the acceptable range of the width and the inclination in advance, acquiring the intersection image of the reflective surfaces by the intersection image acquiring procedure, and determining whether or not the width and the inclination of the acquired intersection image are within the acceptable range by the joining condition determining procedure.

BRIEF DESCRIPTION OF THE DRAWINGS

FIG. 1 is a schematic showing a structure of a projector including a cross-dichroic prism as an optical element to be inspected by an optical element inspection device according to an embodiment of the present invention;

FIG. 2 is an overall perspective view showing a structure of the projector;

FIG. 3 is an exploded plan view showing the cross-dichroic prism;

FIG. 4 is a perspective view showing a structure of an optical parts in the above embodiment;

FIG. 5 is a plan view showing a fixed plate in the above embodiment;

FIG. 6 is a side view showing the cross-dichroic prism and the fixed plate in the above embodiment;

FIG. 7 is a front view showing the optical element inspection device;

FIG. 8 is a plan view showing the optical element inspection device;

FIG. 9 is a side view showing the optical element inspection device;

FIG. 10 is a schematic showing an autocollimator in the above embodiment;

FIG. 11 is a schematic showing a major part of a 3CCD camera in the autocollimator;

FIG. 12 is a schematic showing a processing unit in the embodiment;

FIG. 13 is a front view showing switching device the optical element inspection device;

FIG. 14 is a side view showing the switching device;

FIG. 15 is a schematic showing a computer in the embodiment;

FIG. 16 is a flowchart showing an inspection procedure by the inspection device;

FIG. 17 is a flowchart describing a procedure to adjust the autocollimator of the embodiment;

FIG. 18 is a flowchart describing a procedure to adjust a reflecting mirror in the embodiment;

FIG. 19 is a flowchart describing a procedure to adjust a CCD camera in the embodiment;

FIG. 20 is a schematic describing a procedure to adjust a CCD camera in the embodiment;

FIG. 21 is a flowchart describing a procedure for inspecting the deviation of each reflective surface in the embodiment;

FIG. 22 is a schematic showing the return light on a display in the embodiment;

FIG. 23 is a schematic showing the deviation of the reflective surface in the cross-dichroic prism;

FIG. 24 is a schematic showing the deviation of the reflective surface in the cross-dichroic prism;

FIG. 25 is a flowchart describing a procedure to inspect the relative position of each reflective surface in the embodiment;

FIG. 26 is a schematic showing the return light of each reflective surface on the display in the embodiment;

FIG. 27 is a schematic showing the deviation between reflective surfaces in the cross-dichroic prism;

FIG. 28 is a flowchart describing inspecting the joining condition of the reflective surfaces of the cross-dichroic prism;

FIG. 29 is a schematic showing the joining condition of the reflective surfaces of the cross-dichroic prism.

DETAILED DESCRIPTION OF PREFERRED EMBODIMENTS

An embodiment of the present invention will be described with reference to the drawings.

[1. Structure of Projector]

FIGS. 1 and 2 show a projector 1 having a cross-dichroic prism 45 for an optical element to be inspected.

The projector 1 includes a power source unit 3 accommodated in an external case and an optical unit 4 of U-shape in plan view similarly disposed in the external case. The projector 1 is substantially rectangular parallelopiped on the whole as shown in FIGS. 1 and 2.

The power source unit 3 includes a power source 31 and a lamp drive circuit (ballast) 32 disposed on the side of the power source 31.

The power source 31 supplies the power supplied through a power supply cable to the lamp drive circuit 32 and a driver board, etc. (not shown), and has an inlet connector 33 in which the power supply cable is inserted. The lamp drive circuit 32 supplies the power to a light source lamp 411 of the optical unit 4.

The optical unit 4 forms an optical image corresponding to image information by optically processing the light beam emitted from the light source lamp 411, and includes an integrator illumination optical system 41, a color separation optical system 42, a relay optical system 43, an electro-optical device 44, a cross-dichroic prism 45 for an optical element, and a projection lens 46.

[2. Configuration of Optical System]

The integrator illumination optical system 41 illuminates an image forming area of three liquid crystal panels 441 (referred to as liquid crystal panels 441R, 441G and 441B, respectively for each color of red, green and blue) constituting the electro-optical device 44 in a substantially uniform manner, and includes a light source device 413, a first lens array 418, a second lens array 414 including a UV filter, a polarization conversion element 415, a first condenser lens 416, a reflecting mirror 424, and a second condenser lens 419.

The light source device 413 includes a light source lamp 411 for a radial light source to emit radial light, and a reflector 412 to reflect the emitted light from the light source lamp 411. The light source lamp 411 often includes a halogen lamp and a metal halide lamp, or a high voltage mercury lamp. A parabolic mirror is used for the reflector 412. An elliptic mirror together with a parallel lens (concave lens) may be used in addition to the parabolic mirror.

The first lens array 418 has a configuration in which small lenses having a substantially rectangular contour are arrayed in a matrix when viewed from the direction of the optical axis. Each small lens splits the light beam emitted from the light source lamp 411 into a plurality of sub light beams. The shape of the contour of each small lens is set so as to be substantially similar to the shape of the image forming area of the liquid crystal panel 441. For example, if the aspect ratio (the ratio of the transverse dimension to the longitudinal dimension) of the image forming area of the liquid crystal panel 441 is 4:3, the aspect ratio of each small lens is also set to be 4:3.

The second lens array 414 has a substantially similar configuration to that of the first lens array 418, and small lenses are arrayed in a matrix therein. The second lens array 414 has a function of focusing the image of each small lens of the first lens array 418 on the liquid crystal panel 441 together with the first condenser lens 416 and the second condenser lens 419.

The polarization conversion element 415 is disposed between the second lens array 414 and the first condenser lens 416, and unitized integrally with the second lens array 414. This polarization conversion element 415 converts the light from the second lens array 414 into the polarized light of one kind, and the utilization efficiency of the light by the electro-optical device 44 can be increased.

More specifically, each partial light converted in the polarized light of one kind by the polarization conversion element 415 is finally substantially superposed on the liquid crystal panels 441R, 441G and 441B of the electro-optical device 44 by the first condenser lens 416 and the second condenser lens 419. Since only one kind of the polarized light can be used in the projector 1 using the liquid crystal panel 441 of the type of converting the polarized light of one kind, substantially one half of the light from the light source lamp 411 emitting random polarized light of other kinds is not utilized. Thus, by using the polarization conversion element 415, the light emitted from the light source lamp 411 is completely converted into the polarized light of one kind to enhance the utilization efficiency of the light in the electro-optical device 44.

The color separation optical system 42 includes two dichroic mirrors 421 and 422, and a reflecting mirror 423, and has a function of separating a plurality of sub light beams emitted from the integrator illumination optical system 41 into three color lights of red, green and blue by the dichroic mirrors 421 and 422.

The relay optical system 43 includes an incident side lens 431, a relay lens 433, and reflecting mirrors 432 and 434, and has a function of leading one of the color lights, i.e., blue light separated by the color separation optical system 42 to a liquid crystal panel 441B.

In the dichroic mirror 421 of the color separation optical system 42, the blue light component and the green light component of the light beam emitted from the integrator illumination optical system 41 are transmitted therethrough, and the red light component is reflected thereby. The red light reflected by the dichroic mirror 421 is reflected by the reflecting mirror 423, and reaches the liquid crystal panel 441R for red color through a field lens 417. This field lens 417 converts each sub light beam emitted from the second lens array 414 into the light beam parallel to the axis (main beam). The field lens 417 provided on the light incidence side of other liquid crystal panel 441G and 441B has a similar function.

Of the blue light and the green light transmitted through the dichroic mirror 421, the green light is reflected by the dichroic mirror 422, and reaches the liquid crystal panel 441G for green through the field lens 417. On the other hand, the blue light is transmitted through the dichroic mirror 422, and passes the relay optical system 43, and reaches the liquid crystal panel 441B for blue light further through the field lens 417. The relay optical system 43 is used for blue light because the optical path length of blue light is greater than that of other color lights, and degradation of the utilization efficiency of the light due to light diffusion or the like can be prevented or substantially prevented. This means that each of the sub light beams incident on the incidence side lens 431 is transmitted through the field lens 417 as is.

The electro-optical device 44 has liquid crystal panels 441R, 441G and 441B for three light modulators, which include, for example, polysilicon TFT used for a switching element, and each color light separated by the color separation optical system 42 is modulated according to image information by these three liquid crystal panels 441R, 441G and 441B to form an optical image.

The cross-dichroic prism 45 forms a color image by synthesizing an image modulated for each color light emitted from three liquid crystal panels 441R, 441G and 441B. The cross-dichroic prism 45 is a substantially cubic prism formed by affixing four rectangular prisms 451 as shown in FIG. 3. A dielectric multi-layer film (not shown) to reflect the red light having the predetermined wavelength range is provided on a red color reflective surface 500 including a set of two surfaces 501 and 502 along the extending direction on these interfaces. A dielectric multi-layer film to reflect the blue light having the wavelength range different from the wavelength range above is provided on a blue color reflective surface 510 including a set of two other reflective surfaces 511 and 512 along the extending direction. Thus, four reflective surfaces 501, 502, 511 and 512 are disposed inside the cross-dichroic prism 45 in an X-shape at right angles. The intersection 520 of reflective surfaces 500 and 510 is a line showing the center position at the cross-dichroic prism 45. The color image synthesized by the cross-dichroic prism 45 is emitted from the projection lens 46, and projected onto a screen in an enlarged manner.

Other than the cross-dichroic prism 45 of the present embodiment, a cross-dichroic prism in which a red color reflective surface 500 and a blue color reflective surface 510 are located opposite to each other can be employed. However, a description is provided regarding the above cross-dichroic prism 45.

The optical systems 4145 described above are accommodated within a synthetic resin light guide 47, as shown in FIG. 2. The light guide 47 includes a lower light guide 471 having grooves with optical parts 414–419, 421–423 and 431–434 slidably fitted thereinto from the top, and a lid-like upper light guide (not shown) to close an upper opening side of the lower light guide 471.

A head part 49 is formed on the light emission side of the light guide 47. The projection lens 46 is fixed to the front side of the head part 49, and the cross-dichroic prism 45 with the liquid crystal panels 441R, 441G and 441B fitted thereto is fixed.

[3. Structure of Optical Parts]

A description is provided below regarding the structure of the optical parts with reference to FIGS. 4–6.

The optical parts include the cross-dichroic prism 45 and the liquid crystal panels 441R, 441G and 44113 integrated with each other.

As shown in FIG. 4, the liquid crystal panels 441R, 441G and 441B are accommodated in a holding frame 443, and adhered to the light beam incident surface side forming the side surface of the cross-dichroic prism 45 via a metal fixing plate 446 by inserting a transparent resin pin 445 in a hole 443A formed in four corner parts in this holding frame 443 together with ultraviolet ray curing adhesive (that is, the fixing to the cross-dichroic prism 45 by a POP (Panel On Prism) structure).

A rectangular aperture 443B is formed in the holding frame 443, the liquid crystal panels 441R, 441G and 441B are exposed from this aperture 443B, and this part forms an image forming area. This means that the color lights R, G and B are introduced in this part of each of the liquid crystal panels 441R, 441G and 441B, and an optical image is formed according to image information. The optical parts including the liquid crystal panels 441R, 441G and 441B and the cross-dichroic prism 45 integrated with each other is fixed to the lower light guide 471 via a fixed plate 447 adhered to an upper surface 45A (a surface orthogonal to the light beam incident surface) of the cross-dichroic prism 45.

The fixed plate 447 has four arm parts 447A extending in four directions in plan view, as shown in FIG. 4. Of the round holes 447B made in each arm part 447A, two round holes 447B substantially on the diagonal are fitted into positioning projections 474 provided on corresponding fitting parts, and screws screwed to corresponding fitting parts 473 are disposed in the remaining two round holes 447B. The fixed plate 447 has a bulbous swollen part 447C in a center part, as shown in FIG. 5. In addition, substantially X-shaped reference lines 447D intersected with each other on a top part 447C1 of the swollen part 447C are formed on a lower side of the fixed plate 447. The prism unit 50 is constituted by adhering and fixing the cross-dichroic prism 45 to the fixed plate 447.

A description is provided regarding a manufacturing method of the prism unit 50 with reference to schematics of FIGS. 5 and 6. Since the cross-dichroic prism 45 and the fixed plate 447 are adhered and fixed to each other in an upside-down manner, FIG. 6 shows the cross-dichroic prism 45 and the fixed plate 447 in an upside-down manner.

Firstly, while observing the components from the top, the upper surface 45A (the lower side in FIG. 6) of the cross-dichroic prism 45 is abutted on the top part 447C1 of the swollen part 447C of the fixed plate 447 so that the intersections 520 of four reflective surfaces 501, 502, 511 and 512 inside overlap. Then, non-cured ultraviolet ray curing type adhesive is filled between the cross-dichroic prism 45 and the fixed plate 447. Next, the four reflective surfaces 501, 502, 511 and 512 are positioned to the reference lines 447D of the fixed plate 447, and then the attitude is adjusted to a condition in which the fixed plate 447 is substantially parallel to the upper surface 45A of the cross-dichroic prism 45, in other words, the cross-dichroic prism 45 is not inclined with respect to the fixed plate 447. After the position of the cross-dichroic prism 45 is adjusted with respect to the fixed plate 447, the ultraviolet ray is irradiated from the lower surface (the upper surface in FIG. 6) of the cross-dichroic prism 45 to the upper surface 45A to cure the ultraviolet ray curing adhesive.

[4. Structure of Optical Element Inspection Device]

FIG. 7 is a front view showing a prism inspection unit 600 for the optical element inspection device, and FIGS. 8 and 9 are plan views and a right side view thereof, respectively.

The prism inspection unit 600 is a device to inspect the relative position between four reflective surfaces 501, 502, 511 and 512 of the cross-dichroic prism 45, and to inspect the manufacturing accuracy of the prism unit 50 as shown in FIG. 7, and includes an inspection table 601 with a caster 601A installed on the lower side in a movable manner, and an inspection unit body 602 installed on this inspection table 601.

The inspection unit body 602 includes a pedestal 610 to install the prism unit 50 including the cross-dichroic prism 45 to be inspected via a predetermined holder 611, and an autocollimator 620 disposed facing an emission end face 45E of the cross-dichroic prism 45 installed on this pedestal 610. The inspection unit body 602 further includes a switching device 630 for a measurement light switching unit disposed between the autocollimator 620 and the cross-dichroic prism 45, two reflection units 640 and 650 disposed facing incidence end faces 45B and 45R of the cross-dichroic prism 45, a front-to-back measurement CCD camera 660 disposed on a back side of the reflection unit 650, a right-to-left measurement CCD camera 670 disposed facing the incidence end face 45G of the cross-dichroic prism 45, a computer 680 which processes the image detected by these two CCD cameras 660 and 670 and displays on a monitor 682, and a drive body (not shown) to control the drive of the reflection units 640 and 650.

In the prism inspection unit 600, the left side, the right side, the proximal side and the distal side viewed from the autocollimator 620 described below are set to be the left direction, the right direction, the forward direction, and the rear direction, respectively.

The pedestal 610 is a member to install and fix the prism unit 50 together with other optical parts (not shown) via each holder 611 corresponding to the shape, etc., of each optical parts, and the reference lines are formed on the upper surface thereof. Four columns 611A are erected on the holder 611 to fix the prism unit at the positions corresponding to the round holes 447B of the arm part 447A of the fixed plate 447, as shown in FIG. 9. The prism unit 50 is installed and fixed astride upper ends of these four columns 611A.

The autocollimator 620 introduces the measurement light X normally in an emission end face 45E of the cross-dichroic prism 45 as shown in FIG. 10, and detects the return light Y of this introduced measurement light X, and is capable of adjusting the position with respect to the prism unit 50, and includes an autocollimator body 621 and a 3CCD camera 625. This means that the autocollimator 620 integrally includes the measurement light introduction unit and the return light detection unit of the present invention. In order to normally introduce the measurement light X in the emission end face 45E of the cross-dichroic prism 45, the measurement light X is introduced in four reflective surfaces 501, 502, 511 and 512 of the cross-dichroic prism 45 at the angle of incidence of 45°.

The autocollimator body 621 includes a light source unit 622 to emit the measurement light X, an objective lens 623 to emit the measurement light X emitted from the light source unit 622 as parallel beam, and a light introduction unit 624 to introduce the measurement light X emitted from the light source unit 622 and the return light Y of this measurement light X.

The light source unit 622 includes a light source 622A which is disposed at the back focus position of the objective lens 623, and emits the measurement light X which is halogen beam, and a chart 622B with a "+"-shaped transmission aperture formed therein. The measurement light X emitted from the light source 622A passes through the chart 622B, and is emitted into a light introduction unit 624 as the "+"-shaped measurement light X.

The light introduction unit 624 has a half mirror 624A which is disposed substantially at 45° with respect to the chart 622B of the light source unit 622, and the measurement light X emitted from the light source unit 622 is reflected by the half mirror 624A, and formed into parallel light beam by the objective lens 623.

The 3CCD camera 625 detects the "+"-shaped return light Y as shown in FIG. 11, and includes a color separation dichroic prism 626 as a color separation optical system, red color image pickup (R—CCD) 627R, green color image pickup (G-CCD) 627G, and blue color image pickup (B-CCD) 627B disposed on light emitting end faces 626R, 626G and 626B of this color separation dichroic prism 626, respectively, and a processing unit 628 included in a computer separate from the computer 680.

The color separation dichroic prism 626 is formed by affixing three prisms of predetermined shape, and the "+"- shaped return light Y is separated into three color lights of red light R, green light G, and blue light B.

Each of image pickup elements 627R, 627G and 627B is electrically connected to a processing unit 628, and the image signal detected by each of the image pickup elements 627R, 627G and 627B is output to the processing unit 628.

The processing unit 628 includes, as shown in FIG. 12, a video capture board 628A as an image take-in unit for taking in the image signal detected by each of the image pickup elements 627R, 627G and 627B, an image processing unit 628B to process the image signal taken in by this video capture board 628A, and a reflective surface angle difference measurement unit 628C to measure the angle formed by two reflective surfaces 501 and 502 at the red color reflective surface 500 and the angle formed by two reflective surfaces 511 and 512 at the blue color reflective surface 510 based on the processed image signal. The details thereof are described below.

The return light Y may be visually detected via an eyepiece by disposing the eyepiece to enlarge the return light Y in place of the 3CCD camera 625, though the configuration thereof is not shown in FIG. 12.

The switching device 630 introduces the measurement light X only into one of a left side area LA and a right side area RA which are two areas demarcated by the intersection 520 of the cross-dichroic prism 45 when viewed from the introducing direction of the measurement light X emitted from the autocollimator 620 with reference to FIG. 3, in other words, it does not introduce the measurement light X into only either the area LA or the area RA. The switching device 630 is installed on a front side of the pedestal 610 as shown in FIGS. 13 and 14, and compares a metal, rectangular light shielding plate 631 to shield the measurement light X, a sliding part 632 which is fixed to the lower side of this light shielding plate 631 and slidable in the right-to-left direction with respect to the pedestal 610, and an operation part 633 fixed to a front side of this sliding part 632.

As shown in FIG. 13, the sliding part 632 includes a rail 632A installed on a front surface of the pedestal 610 and extending in the right-to-left direction, and a sliding part body 632B which is fixed to the lower side of the light shielding plate 631 and slidably provided on the rail 632A, and the sliding part body 632B is slidable in the right-to-left direction along the rail 632A. The sliding part 632 is designed so that the light shielding plate 631 only covers either the left side area LA or the right side area RA of the cross-dichroic prism 45.

The operation part 633 includes a long operation part body 633A which is screwed to the front side of the sliding part body 632B, a handle 633B fixed to an upper end part of this operation part body 633A, and a shaft member 633C fixed to a lower end part of the operation part body 633A and the front side of the pedestal 610, and the handle 633B is turnable around a shaft member 633C thereby.

Thus, the sliding part body 632B is slidable in the right-to-left direction along the rail 632A according to the turn of the handle 633B, and the light shielding plate 631 fixed to the sliding part body 632B is also moved in the right-to-left direction, and as a result, only either the left side area LA or the right side area RA of the cross-dichroic prism 45 can be covered by the operation of the handle 633B.

A reflection unit 640 reflects the measurement light X which is introduced from the autocollimator 620 into the cross-dichroic prism 45, and reflected by the red color reflective surface 500, and returns it to the autocollimator 620 as the return light Y. As shown in FIG. 9, the reflection unit 640 includes a rectangular reflecting mirror 641 disposed facing the incident end face 45R of the cross-dichroic prism 45, and a two-axis adjusting unit 643 which adjusts the position of the rotational direction in the horizontal plane and the inclination direction of the vertical plane of the reflecting mirror 641 via a supporting plate 642 to support this reflecting mirror 641 by controlling the drive of a motor, etc., of the drive body.

A reflection unit 650 reflects the measurement light X which is introduced from the autocollimator 620 into the cross-dichroic prism 45 and reflected by the blue color reflective surface 510, and returns it to the autocollimator 620 as the return light Y. As shown in FIG. 9, the reflection unit 650 includes a reflecting mirror 651 disposed facing the incidence end face 45B of the cross-dichroic prism 45, a supporting plate 652 which supports this reflecting mirror 651 on the right side and has an aperture 652A (FIG. 8) formed at the position corresponding to the intersection 520 of the cross-dichroic prism 45, and a two-axis adjusting unit 653 to adjust the position of the rotational direction of the horizontal plane and the inclination direction of the vertical plane of the reflecting mirror 651 by controlling the drive of a motor, etc. of the drive body to adjust the three-dimensional position of this supporting plate 652. The reflecting mirrors 641 and 651 are identical to each other, and the two-axis adjusting units 643 and 653 are also identical to each other.

A front-to-back measurement CCD camera 660 detects the intersection 520 of the cross-dichroic prism 45 from the right side (the back side) of the reflection unit 650, and is electrically connected to the computer 680. As shown in FIGS. 8 and 9, this front-to-back measurement CCD camera 660 includes a CCD camera body 661 as an intersection image pickup unit to pick up the image of the intersection 520, and a predetermined micrometer 662 which is movable in both the longitudinal direction and the right-to-left direction.

A right-to-left measurement CCD camera 670 detects the intersection 520 of the cross-dichroic prism 45 from the back side of the cross-dichroic prism 45, and has the same configuration as that of the front-to-back measurement CCD camera 660. The right-to-left measurement CCD camera 670 is capable of moving the CCD camera body 661 in both the right-to-left direction and the longitudinal direction by the predetermined micrometer 662.

Thus, by adjusting the position of the CCD cameras 660 and 670 in the longitudinal direction and in the right-to-left direction by the micrometer 662, the focus can be adjusted, and the reference can be positioned in the intersection image picked up by the CCD cameras 660 and 670.

The computer 680 processes the intersection image of the cross-dichroic prism 45 detected by the two CCD cameras 660 and 670, and determines the joining condition of the four reflective surfaces 501, 502, 511 and 512, and as shown in FIG. 8, includes a body 681 having a CPU to execute various programs, a storage device, etc., and a monitor 682 to display the determined result.

As shown in FIG. 15, the body 681 includes a video capture board 681A to convert the image of the intersection 520 respectively detected by the two CCD cameras 660 and 670 into the image signal for computer, an image processing unit 681B to process this converted image signal, an intersection calculation unit 681C to calculate the width and the angle of inclination from the reference axis of the processed intersection image, a joining condition determining unit 681D to determine acceptance or rejection based on the calculated result, and a display unit 681E to display the intersection image processed respectively by the CCD cameras 660 and 670 and the result of determination on the monitor 682, respectively.

In the above prism inspection unit 600, if the measurement light X is emitted from the autocollimator 620, this measurement light X is not introduced in one of the areas LA and RA by the light shielding plate 631 in the four reflective surfaces 501, 502, 511 and 512 of the cross-dichroic prism 45, while the measurement light X is introduced only in the remaining area LA or RA. This introduced measurement light X is reflected by the reflective surfaces 501, 502, 511 and 512, and then reflected by the reflecting mirrors 641 and 651 to form the return light Y. This return light Y is incident on the cross-dichroic prism 45 again, and reflected by the same reflective surfaces 501, 502, 511 and 512 as the above, and then introduced in the autocollimator 620. This return light Y is detected by the 3CCD camera 625 in the autocollimator 620.

[5. Optical Element Inspection Method]

In this prism inspection unit 600, the inspection of the cross-dichroic prism 45 which is an object for inspection is performed based on the flowchart shown in FIG. 16.

(1) Firstly, before inspecting the cross-dichroic prism 45, the position of the autocollimator 620 is fixed (Step S1). More specifically, the position is fixed based on the flowchart shown in FIG. 17.

(1-1) A substantially regular hexahedron reference mirror block (not shown) with one surface as a mirror surface is disposed at the predetermined position of the pedestal 610 via a corresponding holder 611 so that the mirror surface faces the autocollimator 620 (Step S11).

(1-2) The measurement light X is emitted from the autocollimator 620, and the return light Y which is reflected by the mirror surface is detected by the 3CCD camera 625 (Step S12).

(1-3) The position of the measurement light X is fixed by adjusting the autocollimator 620 so that the "+"-shaped image for each color light of the return light Y agrees with the reference position for each color light indicating the position of the measurement light X while checking the result of detection by the 3CCD camera 625 (Step S13).

(2) Next, the positions of the reflecting mirrors 641 and 651 in a reflector are fixed (Step S2). More specifically, the positions are fixed based on the flowchart of FIG. 18.

(2-1) Firstly, a dummy triangular prism (not shown) that is substantially right-angled prism with an inclined surface of a mirror surface is disposed on the predetermined position of the pedestal 610 via a corresponding holder 611 so that the mirror surface is at the position of the red color reflective surface 500, i.e., the mirror surface faces the autocollimator 620 and the reflecting mirror 641 (Step S21).

(2-2) The measurement light X is emitted from the autocollimator 620, and the return light Y reflected by the mirror surface, reflected by the reflecting mirror 641, and reflected by the mirror surface again is detected by the 3CCD camera 625 (Step S22).

(2-3) After the position of the reflecting mirror 641 is adjusted by the two-axis adjusting unit 643 so that the "+"-shaped image of the return light Y for each color light agrees with the reference position for each color light indicating the position of the measurement light X while checking the result of detection by the 3CCD camera 625, and the reflecting mirror 641 is fixed (Step S23).

(2-4) Then, the dummy triangular prism (not shown) that is a substantially right-angled prism is rearranged to be at the predetermined position of the pedestal 610 via the same holder 611 so that the mirror surface is at the position of the blue color reflective surface 510, and in the similar procedure as the above, the position of the reflecting mirror 651 is adjusted by the two-axis adjusting unit 653, and then the reflecting mirror 651 is fixed (Step S24).

(3) Next, the positions of the two CCD cameras 660 and 670 are fixed (Step S3). More specifically, the positions are fixed based on the flowchart of FIG. 19.

(3-1) Firstly, as shown in FIG. 20, substantially rectangular parallelopiped block 701 made of metal or glass to detect edge, and a rectangular parallelopiped dummy glass 702 of one half thickness of the cross-dichroic prism 45 are prepared. Next, the block 701 is disposed at the predetermined position of the pedestal 610 via the corresponding holder 611 so that an apex 701A of this block 701 is at the center position C of the holder 611, and a ridge 701B of the block 701 is at the center position C of the holder 611. In addition, a dummy glass 702 to prevent focus shift caused by the difference between the index of refraction in glass and the index of refraction in air is disposed normal to the optical axis of the front-to-back measurement CCD camera 660 between the block 701 and the front-to-back measurement CCD camera 660 (Step S31).

(3-2) In this condition, the image of the ridge 701B of the block 701 is picked up by the front-to-back measurement CCD camera 660, and the focus of the taken-in image is adjusted by advancing or retracting the front-to-back measurement CCD camera 660 in the direction of the dummy glass 702 (the vertical direction in FIG. 20). Then, the position of the front-to-back measurement CCD camera 660 is adjusted in the right-to-left direction in the figure so that the image of the ridge 701B of the block 701 agrees with the reference position indicating the center position C (Step S32).

(3-3) Next, the block 701 is left as it is, and the dummy glass 702 is repositioned so that it is normal to the optical axis of the right-to-left measurement CCD camera 670 between the block 701 and the right-to-left measurement CCD camera 670 (Step S33).

(3-4) In this condition, the image of the ridge 701B of the block 701 is picked up by the right-to-left measurement CCD camera 670, and the focus of the taken-in image is adjusted by advancing or retracting the right-to-left measurement CCD camera 670 in the direction of the dummy glass 702 (the right-to-left direction in the figure). Then, the position of the right-to-left measurement CCD camera 670 is adjusted in the vertical direction in the figure so that the image of the ridge 701B of the block 701 agrees with the reference position indicating the center position C (Step S34). Thus, the positions of the two CCD cameras 660 and 670 are adjusted and fixed.

(4) Next, the prism unit 50 to be inspected is correctly installed and fixed at the predetermined position of the pedestal 610 via the corresponding holder 611 (Step S4).

(5) Now the preliminary preparation of the inspection is completed, and in this condition, the directions of the blue color reflective surface 510 and the red color reflective surface 500 with respect to fixed plate 447 are inspected in the cross-dichroic prism 45 of the prism unit 50 (Step S5). More specifically, the directions are inspected based on the flowchart in FIG. 21.

(5-1) The measurement light X emitted from the autocollimator 620 into the end face 45E of the cross-dichroic prism 45 with the light shielding plate 631 inserted therein, is reflected by the blue reflective surface 500 to form the blue measurement light XB, and then reflected by the reflecting mirror 651 to form the return light YB, and the return light YB reflected by the blue reflective surface 500 again is returned to the autocollimator 620. Then, the position of this return light YB is detected by the image pickup element 627B of the 3CCD camera 625, this detection signal is taken in by the video capture board 628A, and this detection signal is image-processed by the image processing unit 628B. This processed image is displayed on the display D (FIG. 22), and stored in a memory or the like in the computer (Step S51).

(5-2) Next, based on the deviation D1 in the vertical direction on the display D shown in FIG. 22 between the preset reference position and the position of the processed image, the rotational deviation OBl of the blue color reflective surface 510 with respect to the reference position is calculated as shown in FIG. 23 (Processing S52).

(5-3) Further, based on the deviation D2 in the right-to-left direction shown in FIG. 22, the inclination ηB2 with respect to the reference position, i.e., the tilt quantity with respect to the axis of illumination light is calculated as shown in FIG. 24 (Step S53).

(5-4) Similarly, the red return light YR which is emitted from the autocollimator 620 and reflected by the red color reflective surface 500 and the reflecting mirror 641 is detected by the 3CCD camera 625, and the rotational deviation θR1 and the inclination θR2 shown in FIGS. 23 and 24 are calculated (Processing S54). The acceptable ranges for both the rotational deviation θB1 and θB2, and the inclination θR1 and θR2 are ±5 minutes, respectively.

(6) Next, the light shielding plate 631 is set, and the relative positions between the reflective surfaces 501, 502, 511 and 512 at the cross-dichroic prism 45 of the prism unit 50 are inspected (Step S6). More specifically, the relative positions are inspected based on the flowchart of FIG. 25.

(6-1) The measurement light X is emitted from the autocollimator 620 to the right side area RA, and the return light Y reflected by the reflecting mirrors 641 and 651 is detected by the 3CCD camera 625 (Step S61: measurement light introducing procedure and return light detecting procedure). More specifically, the blue light XB out of the measurement light X is reflected by the blue color reflective surface 510, and then reflected by the reflecting mirror 651 to form the blue return light YB, and again reflected by the blue color reflective surface 510, and returned to the autocollimator 620. Then, the position of this blue return light YB is detected by the image pickup element 627B of the 3CCD camera 625, the detected signal is taken in by the video capture board 628A, and this detected signal is image-processed by the image processing unit 628B. This processed image is displayed on the display D, and stored in a memory or the like in the computer.

(6-2) Next, the measurement light X is emitted to the left side area LA by operating the handle 633B of the switching device 630 in a similar manner to Step S61, and the blue return light YB reflected by the reflecting mirror 651 is detected by the 3CCD camera 625 (Step S62: measurement light switching procedure).

(6-3) FIG. 26 shows the result of detection of the case in which the blue color reflective surface 510 (512) of the right side area RA is deviated from the blue color reflective surface 510 (511) of the left side area LA. The reflective surface angle difference measuring unit 628C. The reflective surface angle difference measuring unit 628C calculates the horizontal deviation PB of the blue color reflective surface 510 (511) of the left side area LA with reference to the blue color reflective surface 510 (512) of the right side area RA, i.e., the deviation (the angle formed) from the extending directions of the reflective surfaces 511 and 512 as shown in FIG. 27 based on the deviation DB1 in the vertical direction (Step S63: deviation detecting procedure). The acceptable range of this horizontal deviation PB is ±15 seconds.

(6-4) Next, the vertical deviation QB (not shown) which is the angle formed by the blue color reflective surface 510 (511) of the left side area LA with reference to the blue color reflective surface 510 (512) of the right side area RA based on the deviation DB2 in the right-to-left direction shown in FIG. 26 (Step S64: deviation detecting procedure). The acceptable range of this vertical deviation QB is also ±15 seconds.

(6-5) Similar to the case of the blue light, by operating the switching device 630 (Processing S65), the reflective surface angle difference measuring unit 628C calculates the horizontal deviation PR and the vertical deviation QR (not shown) between the red reflective surfaces 501 and 502 shown in FIG. 27 based on the deviations DR1 and DR2 with reference to the red color reflective surface 500 (502) of the right side area RA (Processing S66).

(7) Next, the joining condition (the joining and fixing accuracy) of the fixed plate 447 to the cross-dichroic prism 45 of the prism unit 50 is inspected (Step S7). More specifically, the joining condition is inspected based on the flowchart in FIG. 28.

(7-1) In the preliminarily fixed front-to-back measurement CCD camera 660, the CCD camera body 661 picks up the image of the intersection 520, and based on the image picked-up and image-processed intersection 520, the intersection calculation unit 681C calculates the deviation T1 in the longitudinal direction of the intersection 520 with respect to the reference line, the width dimension T2 of the intersection 520 with respect to the reference line, and the inclination φ with respect to the reference line as shown in FIG. 29 (Step S71: the intersection image acquiring procedure). The width dimension T2 of the intersection 520 is measured, and if the width dimension T2 of the intersection 520 is larger than the reference value, it can be confirmed that a translating deviation is generated between the extending four reflective surfaces 501, 502, 511 and 512.

The acceptable range of the deviation T1 in the longitudinal direction is ±0.05 mm. In addition, the acceptable ranges of the width dimension T2 and the inclination φ are also appropriately set.

(7-2) Similarly to the above, in the right-to-left measurement CCD camera 670, the deviation T1 in the right-to-left direction of the intersection 520 with respect to the reference line, the width dimension T2 of the intersection 520, and the inclination φ with respect to the reference line are calculated by picking up the image of the intersection 520 by the CCD camera body 671 (the intersection image acquiring procedure) (Step S72).

(8) When the above operations are completed, the joining condition determining unit 681D determines whether the measured deviations T1, T2 and φ are all in acceptable ranges (Step S8: joining condition determining procedure). If the measured deviations are within the acceptable range, the prism unit is determined to be an acceptable one, and if the measured deviations is outside the acceptable range, the other prism unit is determined to be a rejected one. The acceptance or rejection of other deviations may also be determined automatically.

(9) Finally, all the inspections are completed by detaching the prism unit 50 from the predetermined holder 611 (Step S9).

[6. Advantages]

The following advantages can be obtained according to this embodiment.

(1) Since the measurement light X is emitted from the autocollimator 620 and this measurement light X is switched for inspection so that it is directed to the right side area RA or the left side area LA of the color reflective surfaces 500 and 510 by the switching device 630, the relative positions of the four reflective surfaces 501, 502, 511 and 512 of the color reflective surfaces 500 and 510 can be easily inspected. Thus, the acceptance or rejection determination accuracy of the cross-dichroic prism 45 can be heightened. In addition, the cross-dichroic prism 45 which is determined to be acceptable in these inspections is included in the projector 1, the projected image by the projector 1 can also be sharpened.

(2) By employing the autocollimator 620 with the measurement introduction unit and the return light detection unit integrated with each other, the inspection device 600 can be miniaturized compared with a case in which the measurement introduction unit and the return light detection unit are separately disposed from each other.

(3) By installing the reflecting mirrors 641 and 651 on the end faces 45R and 45B of the cross-dichroic prism 45, the bright return light Y can be reliably introduced, and easily detected by the autocollimator 620.

(4) By employing the 3CCD camera 625 to detect the return light Y, the return light Y can be more reliably and automatically detected compared with a case in which the return light is detected, for example, visually, and the burden on an operator can be reduced. Alternatively, a configuration is also possible, in which a plurality of color filters consisting of each color are provided, the return light Y is successively passed through these color filters, and the return light Y is detected by the return light detection unit for each color light. However, the return light Y can be detected more easily than a case in which the 3CCD camera 625 is employed, since the color filters need not be replaced.

(5) The return light Y is detected by the image pickup elements 627R, 627G and 627B, this detected signal is taken in by the video capture board 628A, the taken-in image signal is image-processed by the image processing unit 628B, and the reflective surface angle difference measuring unit 628C calculates the angle formed between the four reflective surfaces 501, 502, 511 and 512 of the color reflective surfaces 500 and 510. Thus, by setting the acceptable range of the angle deviations PR and PB in advance, the angle deviations PR and PB between the four reflective surfaces 501, 502, 511 and 512 of the color reflective surfaces 500 and 510 can be easily and automatically inspected.

(6) The width dimension T2 of the intersection 520 is measured by the CCD cameras 660 and 670, and the deviation of this translation can be easily inspected even when the four reflective surfaces 501, 502, 511 and 512 of the color reflective surfaces 500 and 510 are translated and deviated. The inclination φ of the intersection 520 is measured by the CCD cameras 660 and 670, and this inclination φ can be easily inspected even when the four reflective surfaces 501, 502, 511 and 512 of the color reflective surfaces 500 and 510 are inclined and deviated from the reference axis normal to the optical axis of the measurement light X. Similarly, the deviation T1 in the longitudinal and right-to-left directions can be easily inspected. Since the acceptable ranges of the deviation T1, the width dimension T2 and the inclination φ are set in advance, they can be easily and automatically inspected.

(7) Since the switching device 630 has a relatively simple structure that makes it possible to switch the light shielding plate 631 by simply operating the handle 633B, the cost of the switching device 630 can be reduced or suppressed.

[7. Modification]

The present invention is not limited to the above embodiment, but includes other configurations capable of addressing or achieving advantages of the present invention, and the exemplary modifications discussed below are also included in the present invention.

For example, in the above embodiment, the reflection units 640 and 650 are disposed facing the end faces 45R and 45B of the cross-dichroic prism 45, but the present invention is not limited thereto. For example, a reflecting mirror may be affixed to the end faces 45R and 45B of the cross-dichroic prism 45. However, the above embodiment has an advantage in that the position of the reflecting mirror can be adjusted correctly. In addition, the light may be reflected by each end face without providing any reflecting mirror or the like.

In the above embodiment, the cross-dichroic prism 45 of the color synthesis optical system is inspected as the optical element, but the present invention is not limited thereto. A color separation optical system or the like including affixed mirrors may be inspected. Further, in the above embodiment, the inspection order of the inspection items is not limited to the above order.

In the above embodiment, the CCD cameras 660 and 670 are manually adjusted, but may be automatically adjusted. In addition, the autocollimator 620 may be automatically adjusted.

Furthermore, the switching device may be configured so that it includes a groove, for example, into which an end of the light shielding plate can be inserted, thereby making it possible to perform switching of the light shielding areas by placing the light shielding plate into or out of the switching device along this groove. In this case, the configuration is relatively simple, and the cost of the switching device can be reduced or suppressed. A material of the light shielding plate is not limited to metal, but any other materials, such as resin, may be acceptable if they have light shielding function. In this condition, the shape of the light shielding plate is not limited either.

In addition, in the switching device 630 of the above embodiment, the handle 633B is manually operated, and may be automatically switched.

In the above embodiment, the 3CCD camera 625 is employed in the autocollimator 620, but the present invention is not limited to. Detection may be performed by a regular CCD camera or visually.

In the above embodiment, the autocollimator 620 is employed, and the measurement light introduction unit and the return light detection unit are integrated with each other. However, the measurement light introduction unit and the return light detection unit may be separate from each other.

In the above embodiment, the acceptable range of the cross-dichroic prism 45 is not limited to the above numerical values. This means that the acceptable range may be changed appropriately according to the model and the purpose of the optical appliances, such as the projector to be built therein.

[Advantage of the Invention]

As described above, the optical element inspection device and the optical element inspection method according to the present invention have an advantage in that the relative position of each reflective surface can be inspected.

What is claimed is:

1. An optical element inspection device to inspect the relative positions of each reflective surface of an optical element having four reflective surfaces disposed in an X-shape so as to form an angle of incidence of 45° when viewed from a direction orthogonal to an optical axis of an incident light beam so that one set of reflective surfaces along one extending direction of the X-shape reflect a light beam of a wavelength range different from that of another set of reflective surfaces, the optical element inspection device comprising:

a pedestal on which the optical element to be inspected is installed;

a measurement light introduction unit to introduce measurement light at the angle of incidence of 45° with respect to any of said four reflective surfaces;

a return light detection unit to detect return light of the measurement light introduced in said optical element from the measurement light introduction unit; and a measurement light switching unit to introduce said measurement light in only either area of two areas demarcated by the intersection of one set of the reflective surfaces with the other set of the reflective surfaces when viewed from the introducing direction of said measurement light.

2. The optical element inspection device according to claim 1, said measurement light introduction unit and said return light detection unit being integrated with each other to form an autocollimator.

3. The optical element inspection device according to claim 1, further comprising:

a reflecting member which reflects light beam reflected by said reflective surface and introduces the light beam in said return light detection unit as return light.

4. The optical element inspection device according to claim 1, said return light detection unit including a color separation optical system to separate return light into a plurality of color lights, and a plurality of image pickup elements each corresponding to each color light separated by said color separation optical system.

5. The optical element inspection device according to claim 4, further comprising:

an image take-in unit to take in a signal detected by said image pickup element; and a reflective surface angle difference measurement unit which performs image processing of the image signal taken in by said image take-in unit, and measures an angle formed by said one set of reflective surfaces or said set of relative surfaces.

6. The optical element inspection device according to claim 1, further comprising:

an intersection image pickup unit to pick up an image of the intersection of said one set of reflective surfaces with said other set of reflective surfaces; and a joining condition determination unit to determine the joining condition of each reflective surface from a width and an inclination of said intersection based on the signal detected by said intersection image pickup unit.

7. An optical element inspection method to inspect relative positions of each reflective surface of an optical element having four reflective surfaces disposed in an X-shape so as to form an angle of incidence of 45° when viewed from a direction orthogonal to an optical axis of an incident light beam so that one set of the reflective surfaces along one extending direction of the X-shape reflect a light beam of a wavelength range different from that of another set of reflective surfaces, comprising:

introducing the measurement light at the angle of incidence of 45° in any of the reflective surfaces of the optical element to be inspected;

detecting return light of the measurement light introduced into said optical element by said introducing;

switching the measurement light so that it is introduced into another reflective surface along said any of the reflective surfaces; and detecting the return light of the switched measurement light, and detecting the deviation of the other reflective surface with respect to said any of the reflective surfaces.

8. The optical element inspection method according to claim 7, further comprising:

acquiring an image of the intersection of said one set of reflective surfaces with said other set of reflective surfaces; and determining the joining condition of each reflective surface from the width and the inclination of said intersection.

9. The optical element inspection device according to claim 2, further comprising:

a reflecting member which reflects light beam reflected by said reflective surface and introduces the light beam in said return light detection unit as return light.

10. The optical element inspection device according to claim 2, said return light detection unit including a color separation optical system to separate return light into a plurality of color lights, and a plurality of image pickup elements each corresponding to each color light separated by said color separation optical system.

11. The optical element inspection device according to claim 3, said return light detection unit including a color separation optical system to separate return light into a plurality of color lights, and a plurality of image pickup elements each corresponding to each color light separated by said color separation optical system.

12. The optical element inspection device according to claim 2, further comprising:

an intersection image pickup unit to pick up an image of the intersection of said one set of reflective surfaces with said other set of reflective surfaces; and a joining condition determination unit to determine the joining condition of each reflective surface from a width and an inclination of said intersection based on the signal detected by said intersection image pickup unit.

13. The optical element inspection device according to claim 3, further comprising:

an intersection image pickup unit to pick up an image of the intersection of said one set of reflective surfaces with said other set of reflective surfaces; and a joining condition determination unit to determine the joining condition of each reflective surface from a width and an inclination of said intersection based on the signal detected by said intersection image pickup unit.

14. The optical element inspection device according to claim 4, further comprising:

an intersection image pickup unit to pick up an image of the intersection of said one set of reflective surfaces with said other set of reflective surfaces; and a joining condition determination unit to determine the joining condition of each reflective surface from a width and an inclination of said intersection based on the signal detected by said intersection image pickup unit.

15. The optical element inspection device according to claim 5, further comprising:

an intersection image pickup unit to pick up an image of the intersection of said one set of reflective surfaces with said other set of reflective surfaces; and a joining condition determination unit to determine the joining condition of each reflective surface from a width and an inclination of said intersection based on the signal detected by said intersection image pickup unit.

* * * * *